US008453163B2

(12) United States Patent
Kothamasu et al.

(10) Patent No.: US 8,453,163 B2
(45) Date of Patent: May 28, 2013

(54) SYSTEMS AND/OR METHODS FOR POLICY-BASED JMS BROKER CLUSTERING

(75) Inventors: Vasudeva Kothamasu, Harlur Village (IN); Derek Rokicki, Western Springs, IL (US); Jason Simpson, Oak Hill, VA (US)

(73) Assignee: Software AG USA, Inc., Reston, VA (US)

( * ) Notice: Subject to any disclaimer, the term of this patent is extended or adjusted under 35 U.S.C. 154(b) by 905 days.

(21) Appl. No.: 12/458,030

(22) Filed: Jun. 29, 2009

(65) Prior Publication Data
US 2010/0333111 A1    Dec. 30, 2010

(51) Int. Cl.
*G06F 9/54*    (2006.01)
(52) U.S. Cl.
USPC ........................................... 719/313; 709/238
(58) Field of Classification Search
CPC .................................................. H04L 41/0893
USPC ....................................................... 719/313
See application file for complete search history.

(56) References Cited

U.S. PATENT DOCUMENTS

| | | | |
|---|---|---|---|
| 6,643,682 B1* | 11/2003 | Todd et al. | 709/202 |
| 7,113,980 B2 | 9/2006 | Jacobs et al. | |
| 2005/0021622 A1* | 1/2005 | Cullen | 709/204 |
| 2005/0267896 A1* | 12/2005 | Goodman et al. | 707/10 |
| 2006/0047666 A1 | 3/2006 | Bedi et al. | |
| 2006/0047742 A1* | 3/2006 | O'Neill et al. | 709/203 |
| 2006/0069777 A1* | 3/2006 | Kato et al. | 709/225 |
| 2008/0228886 A1* | 9/2008 | Reed et al. | 709/206 |
| 2008/0288655 A1* | 11/2008 | Zhao et al. | 709/238 |
| 2009/0064182 A1 | 3/2009 | Holar et al. | |
| 2009/0216901 A1* | 8/2009 | Schloming | 709/237 |
| 2010/0082748 A1* | 4/2010 | Banks et al. | 709/206 |
| 2010/0251262 A1 | 9/2010 | Rokicki | |

OTHER PUBLICATIONS

Monson-Haefel, R.; Chappell, D., "Java Message Service" (Jan. 2001), O'Reilly & Associates, CA, pp. 1-220.*

* cited by examiner

*Primary Examiner* — H S Sough
*Assistant Examiner* — Brian Wathen
(74) *Attorney, Agent, or Firm* — Nixon & Vanderhye PC

(57) ABSTRACT

The example embodiments disclosed herein relate to application integration techniques and, more particularly, to application integration techniques built around the publish-and-subscribe model (or one of its variants). In certain example embodiments, a publishing application, and first and second broker clusters are provided. Each broker cluster comprises a plurality of brokers, and each broker is configured to relay messages from the publishing application to at least one subscribing application. A composite cluster connection is associated with the publishing application, and cluster connections are associated with the composite cluster connection. The message generated by the publishing application is sent to the broker cluster in accordance with a user-defined composite policy. The message is routed from the composite cluster connection to at least one cluster connection based on a first policy layer. The messaging is routed from the at least one cluster to at least one broker based on a second policy layer.

21 Claims, 23 Drawing Sheets

SYSTEMS AND/OR METHODS FOR POLICY-BASED JMS BROKER CLUSTERING

FIELD OF THE INVENTION

The example embodiments disclosed herein relate to application integration techniques and, more particularly, to application integration techniques built around the publish-and-subscribe model (or one of its variants). Certain example embodiments provide client-based policy-oriented load balancing features in which message brokers are organized in a broker cluster. The load balancing policies of certain example embodiments may be "layerable" in certain example embodiments, thereby enabling users to define compound and potentially complex load-balancing features.

BACKGROUND AND SUMMARY OF EXAMPLE EMBODIMENTS OF THE INVENTION

Companies today are tasked with implementing solutions for many types of integration challenges within their respective enterprises. Many of these challenges involve issues of application integration (e.g., integration among and/or between software applications and/or other systems) and fall into common patterns.

For example, a first area relates to propagation of similar business objects from one system to multiple other systems, such as, for example, in an order status change or a product price change. A second area relates to synchronization of similar business objects between two or more systems to obtain a single view, such as, for example, a real-time synchronization of customer, product registration, product order, and product SKU information among several applications. This is the most common issue requiring an integration solution. In a one-way synchronization, there generally is one system (e.g., resource) that acts as a data source and one or more resources that are targets of the synchronization. In a two-way synchronization, every resource often is both a potential source and target of a synchronization. There generally is not a single resource that acts as the primary data resource. Thus, a change to any resource should be reflected in all other resources. A third area involves information joined from multiple sources into a common destination system, such as, for example, communicating pharmacy customer records and prescription transactions and website data into a central application and database.

Various tools have been provided that enable a user to design and deploy solutions that address these challenges using, for example, the publish-and-subscribe model or one of its variants. The publish-and-subscribe model is a specific type of message-based solution in which messages are exchanged anonymously through a message broker. Applications that produce information that needs to be shared make this information available in specific types of recognizable documents that they publish to the message broker. Applications that require information subscribe to the document types they need.

At run time, the message broker receives documents from publishers and then distributes the documents to subscribers. The subscribing application processes or performs work using the document and may or may not send a response to the publishing application.

In a typical system, an integration server or applications running on an integration server publish documents to a broker. The broker then routes the documents to subscribers located on other integration servers. The integration server and the broker share a fast, efficient process for exchanging documents across the entire system.

Although such techniques have been successful in providing solutions to the above-described challenge areas, further enhancements are still possible. For example, the integration server (IS) "Trigger Subsystem" provides a rich infrastructure for message processing (e.g., asynchronous message processing). However, this functionality is only available for messaging over a proprietary (e.g., broker) messaging protocol. Thus, users currently have to make a difficult design decision, choosing between either a feature-rich proprietary protocol, or a standards-based interoperable messaging protocol (e.g., JMS).

One approach to solving this problem has involved the use of a JMS adapter provided to an integration server. Thus, both a proprietary "trigger subsystem" (provided by the integration server for proprietary messaging) and a separate JMS adapter were provided to the integration server.

Unfortunately, this approach is somewhat incomplete. In particular, despite the availability of a JMS adapter for standards-based interoperable messaging, the "trigger subsystem" capabilities could not be fully used in connection with JMS. That is, users who want the extended capabilities of the "trigger subsystem" while using the JMS adapter would have to custom-implement those capabilities in their applications for every new application. This often imposes significant configuration and programming requirements and has led to a plethora of non-standardized implementations of the same and/or similar functionality. This problem is further exacerbated, as JMS is still in the process of being standardized for use in the in web-services context. In essence, this means that if capabilities comparable to those of the proprietary broker were required, they would have to be implemented in the application services layer time and time again. Even where such approaches have been implemented, they have not been standardized, e.g., because enterprises are different in terms of their organizations, processes, requirements, infrastructure, etc.

Thus, a problem remains in that there is not a single means to couple the current "trigger subsystem" and all of its capabilities with standards-based messaging (e.g., via JMS). Accordingly, there remains a tradeoff between a feature-rich proprietary protocol on the one hand, and a standards-based interoperable messaging protocol (e.g., JMS) on the other.

Thus, it will be appreciated that there is a need in the art for improved techniques for providing application integration solutions in one or more of the above-noted and/or other areas.

As described in detail below, one example technique for overcoming these and/or other problems relates to providing a messaging layer that provides a rich feature set for addressing application integration challenges that is accessible through both proprietary and open messaging constructs existing outside of the application layer. Such messaging constructs may be in the form of "triggers," and such triggers may enable a publish-and-subscribe type solution to such application integration challenges in certain example embodiments. These triggers may be JMS triggers.

Another aspect relates to parallel subsystems being accessible through a common trigger subsystem provided as value-added layer above the respective trigger subsystems.

Still another aspect relates to substantially fully embedding JMS as a peer to the proprietary messaging protocol in the integration server trigger subsystem so that all or substantially all existing capabilities would be JMS-enabled.

A further aspect relates to the use of a messaging layer that enables JMS messaging without the use of a special adapter provided to an integration server. Furthermore, such a messaging layer may make it possible to avoid making any changes to the JMS trigger itself and/or may reduce the need for custom programming and/or implementation at the application service level in certain example cases.

Although these brokers are advantageous, further improvements are still possible. For example, it will be appreciated that the broker could be improved so as to offer an extensible load balancing feature. Indeed, the inventors of the instant application have taken note that customers have been requesting failover and load balancing features for their broker applications for the past several years.

Accordingly, one aspect of certain example embodiments relates to allowing brokers to implement client-side failover and load balancing functions. The load balancing functions of certain example embodiments may reside within the application space and also may be scalable.

Another aspect of certain example embodiments relates to enabling load balancing features work with a broker cluster. In this regard, publishers and subscribers may connect to a broker cluster, and the brokers in the broker cluster may share the message routing from publishers to subscribers.

Still another aspect of certain example embodiments relates to providing load balancing functions according to one or more policies, with those policies being "stackable" or "layerable" or "compound."

Certain example embodiments relate to an application integration system. A publishing application is configured to generate and send a message. The message is sendable in accordance with a user-defined composite policy comprising at least first and second policy layers. First and second broker clusters are provided. Each broker cluster comprises a plurality of brokers, and each broker is configured to relay messages from the publishing application to at least one subscribing application. A composite cluster connection is associated with the publishing application. A plurality of cluster connections is associated with the composite cluster connection. The composite cluster connection is configured to route the message to at least one cluster connection in dependence on the first policy layer. Each cluster connection is configured to route the message to at least one broker in dependence on the second policy layer.

Certain example embodiments relate to a message routing method in an application integration system. A publishing application is provided. First and second broker clusters are provided. Each broker cluster comprises a plurality of brokers, and each broker is configured to relay messages from the publishing application to at least one subscribing application. A composite cluster connection is associated with the publishing application. A plurality of cluster connections is associated with the composite cluster connection. A message is generated by the publishing application. The message is sent from the publishing application to the broker cluster in accordance with a user-defined composite policy comprising at least first and second policy layers. The message is routed from the composite cluster connection to at least one cluster connection in dependence on the first policy layer. The messaging is routed from the at least one cluster to at least one broker in dependence on the second policy layer.

Certain example embodiments relate to a method of invoking a target service in an application integration system. First and second client systems are provided, and together they implement a publish/subscribe message exchange model. At least one broker cluster is provided, with the broker cluster including a plurality of broker servers. A message is generated by the first client system, with the message being a trigger for invoking the target service on the second client system. The message is routed from the first client system to at least one broker server in at least one broker cluster to the second client system based on a policy defined by the first client system. The message is received at the second client system. The target service is invoked via the second client system.

These aspects and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

A description of an illustrative application integration system and its example methods of operation will now be provided. It will be appreciated that the following description is provided by way of example and without limitation. Indeed, the implementations set forth below reflect the general techniques associated with one publish-and-subscribe approach to providing application integration solutions developed by the assignee of the instant application, which may be used in connection with the messaging layer, triggers, and trigger subsystems of certain example embodiments.

Figure 1:
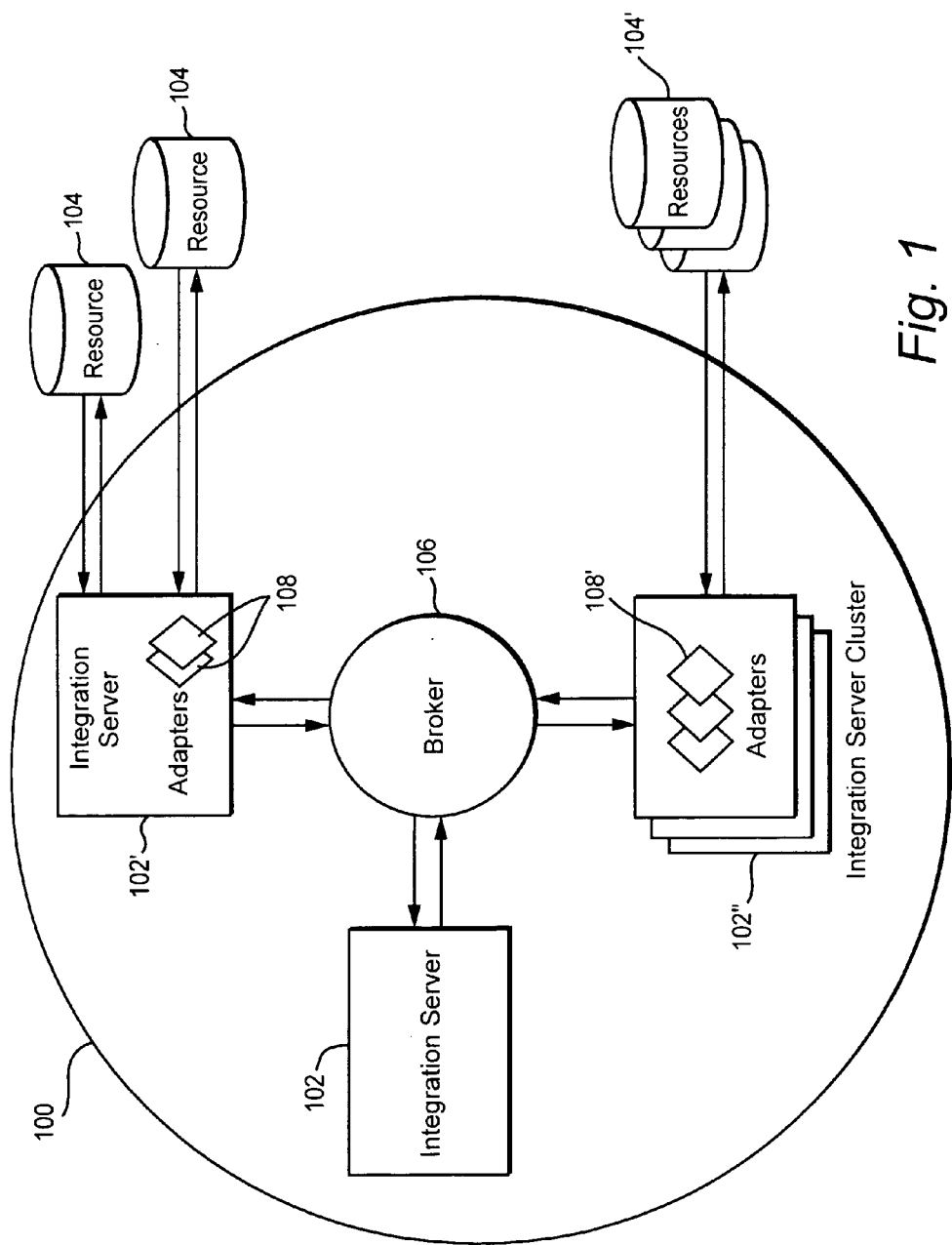
FIG. 1 is a schematic view of an illustrative application integration system.

Referring now more particularly to the drawings, FIG. 1 is a schematic view of an illustrative application integration system 100. A plurality of integration servers 102 are shown, each being in communication with a broker 106. A first integration server 102 is shown, as is a second integration server 102', which includes a plurality of adapters 108. An integration server cluster 102" also is shown, and it includes a plurality of adapters 108' provided thereto.

In general, the integration server is the system's central run-time component. It serves as the entry point for the systems and applications to be integrated, and it is the system's primary engine for the execution of integration logic. It also provides the underlying handlers and facilities that manage the orderly processing of information from resources 104 (or clustered resources 104') inside and/or outside the enterprise. The integration server 102 publishes documents to and receives documents from the broker.

The broker 106 forms the potentially globally scalable messaging backbone of the example components described herein. It provides the infrastructure for implementing asynchronous, message-based solutions that are built on the publish-and-subscribe model or one of its variants, such as, for example, request/reply, publish-and-wait, and the like.

The broker 106 routes documents between information producers (e.g., publishers) and information consumers (e.g., subscribers). Thus, the broker 106 receives, queues, and delivers documents. The broker 106 maintains a registry of document types that it recognizes. It also maintains a list of subscribers that are interested in receiving those types of documents. When the broker 106 receives a published document, it queues it for the subscribers of that document type. Subscribers retrieve documents from their queues. This action usually triggers an activity on the subscriber's system that processes the document.

Multiple brokers 106 optionally may be provided to a system 100. Multiple brokers 106 can operate in groups, called territories, which allow several brokers 106 to share document type and subscription information.

The following is a description of the basic building blocks of an integration solution that uses the publish-and-subscribe model. These building blocks include, for example, documents, publishable document types, triggers, services, adapter notifications, and canonical documents.

In an integration solution built on the publish-and-subscribe model, applications publish and subscribe to documents. Documents are objects that the above-noted components may use to encapsulate and exchange data. A document represents the body of data that a resource passes to the components. Often, it represents a business event, such as, for example, placing an order (e.g., via a purchase order document), shipping goods (e.g., via a shipping notice), adding a new employee (e.g., via a new employee record), etc.

Each published document includes an envelope. The envelope is much like a header in an email message. The envelope records information, such as, for example, the sender's address, the time the document was sent, sequence numbers, and/or other useful information for routing and control. It includes information about the document and its transit through the system.

Every published document is associated with a publishable document type. A publishable document type is a named schema-like definition that describes the structure of a particular kind of document that can be published and subscribed to. An instance of a publishable document type can be published locally within an integration server or can be published to a broker. In a publication environment that includes a broker, each publishable document type may be bound to a broker document type. Clients on the broker subscribe to publishable document types. The broker uses publishable document types to determine which clients to distribute documents to.

Within the publish-and-subscribe model of certain example embodiments described herein, triggers establish subscriptions to publishable document types. Triggers also specify the services that will process documents received by the subscription. Within a trigger, a condition associates one or more publishable document types with a service.

Services are method-like units of work. They contain program logic that the integration server executes. Services may be built to carry out work, such as, for example, extracting data from documents, interacting with back-end resources, publishing documents to the broker, etc. When a trigger is built, a user may specify the service to be used to process the subscribed-to documents.

Adapter notifications notify the system whenever a specific event occurs on an adapter's resource. The adapter notification publishes a document when the specified event occurs on the resource. Each adapter notification has an associated publishable document type. Triggers may be used to subscribe to the publishable document types associated with adapter notifications. The service associated with the publishable document type in the trigger condition may, for example, perform some additional processing, updating, and/or synchronization, e.g., based on the contents of the adapter notification.

A canonical document is a standardized representation that a document may assume while it is passing through the system. A canonical document acts as the intermediary data format between resources. For example, in an implementation that accepts purchase orders from companies, one of the steps in the process may convert the purchase order document to a company's standard purchase order format. This format is called the "canonical" form of the purchase order document. The canonical document is published, delivered, and passed to services that process purchase orders.

By converting a document to a neutral intermediate format, subscribers (e.g., adapter services) only need to know how to convert the canonical document to the required application format. If canonical documents were not used, every subscriber would have to be able to decode the native document format of every publisher.

A canonical document is a publishable document type. The canonical document may be used when building publishing services and subscribed to when building triggers. In flow services, documents may be mapped from the native format of an application to the canonical format.

An overview of illustrative publish-and-subscribe paths is now provided with reference to FIGS. 2-7. As noted above, integration servers exchange documents via publication and subscription. One integration server publishes a document, and one or more integration servers subscribe to and process that document. The integration server generally interacts with the broker to publish and subscribe to documents. For example, an integration server may publish documents to the broker, an integration server may retrieve documents from the broker, and/or an integration server may publish and subscribe to documents locally.

When the integration server is configured to connect to a broker, the integration server can publish documents to the broker. The broker then routes the documents to all of the subscribers. Three example publishing path scenarios are explained below: a document is published to the broker, a document is published to the broker when the broker is not available, and a document is published to the broker and a reply is waited for (e.g., as in a request/reply scenario). If a broker is not configured for the integration server, all publishes may become local publishes, and delivering documents to a specific recipient is not available. This possibility is described in greater detail below.

Figure 2:
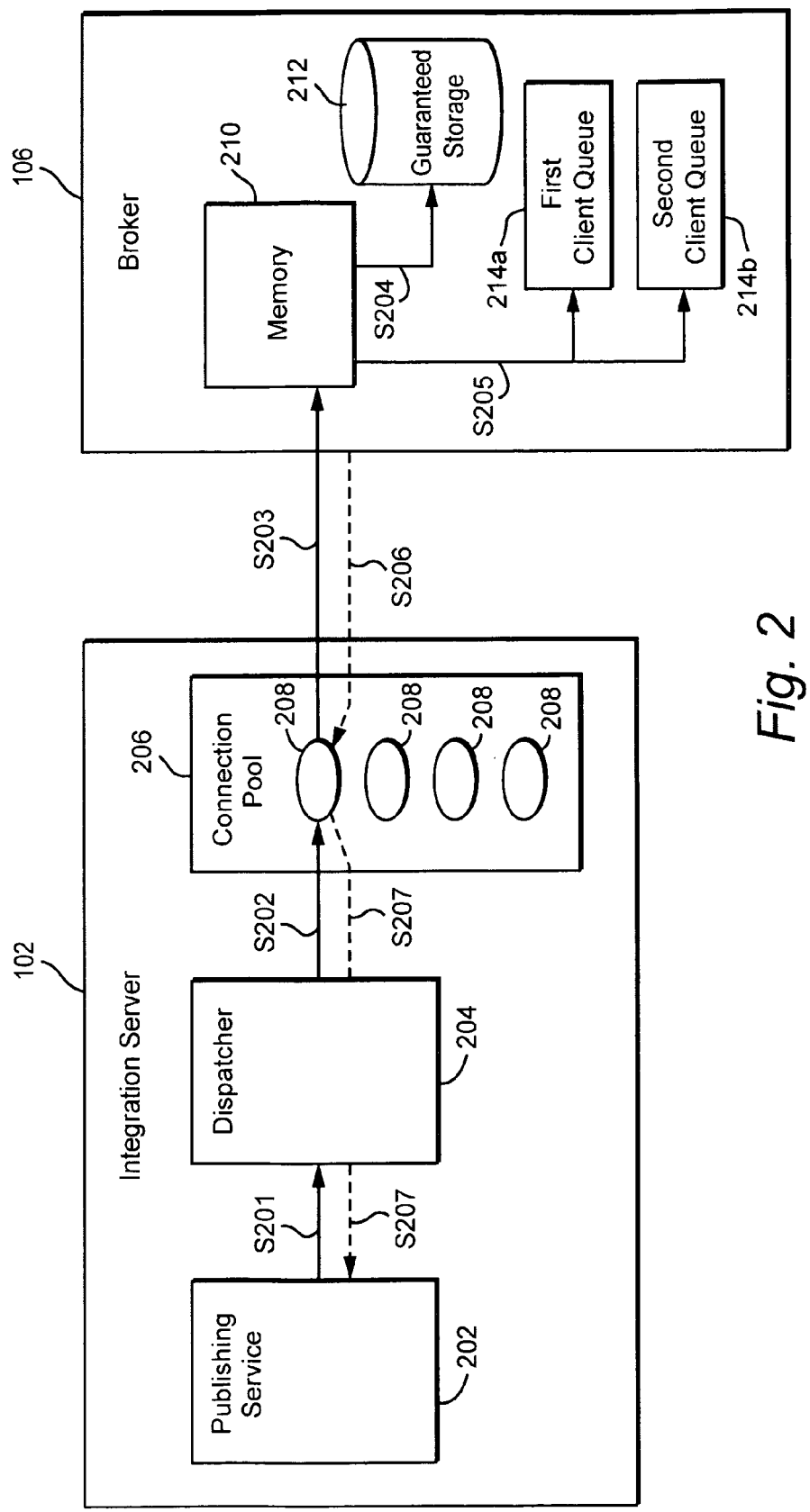
FIG. 2 is a block diagram that illustrates how the integration server publishes or delivers documents to the broker when the broker is connected.

FIG. 2 is a block diagram that illustrates how the integration server publishes or delivers documents to the broker when the broker is connected. When the integration server sends documents to a configured broker, the integration server either publishes or delivers the document. When the integration server publishes a document, it may be broadcast to all subscribers. The broker routes the document to all clients that have subscribed to that document. When the integration server delivers a document, the delivery request identifies the document recipient. The broker places the document in the queue for the specified client only.

A publishing service 202 provided to the integration server 102 sends a document to the dispatcher 204 (or an adapter notification publishes a document when an event occurs on the resource the adapter monitors) (S201). Before the integration server 102 sends the document to the dispatcher 204, it validates the document against its publishable document type. If the document is not valid, the service 202 returns an exception specifying the validation error. The dispatcher 204 obtains a connection 208 from the connection pool 206 (S202). The connection pool 206 is a reserved set of connections 208 that the integration server 102 uses to publish documents to the broker 106. To publish a document to the broker 106, the integration server 102 uses a connection 208 for the default client. The dispatcher 204 sends the document to the broker 106 (S203).

The broker 106 examines the storage type for the document to determine how to store the document (S204). For example, if the document is volatile, the broker 106 may store the document in a memory location 210. If the document is guaranteed, the broker 106 may instead store the document in memory 210 and/or on disk 212.

The broker 106 routes the document to subscribers (S205). If the document was published (e.g., broadcast), the broker 106 identifies subscribers and places a copy of the document in the client queue for each subscriber (e.g., both first and second client queues 214a-b). If the document was delivered, the broker 106 places the document in the queue for the client specified in the delivery request (e.g., either first and second client queues 214a-b). If there are no subscribers for the document, the broker 106 returns an acknowledgement to the publisher 202 and then discards the document. If, however, a deadletter subscription exists for the document, the broker 106 deposits the document in the queue containing the deadletter subscription (e.g., either or both of first and second client queues 214a-b). A document remains in the queue (e.g., either or both of first and second client queues 214a-b) on the broker 106 until it is picked up by the subscribing client. If the time-to-live for the document elapses, the broker 106 discards the document. The time-to-live period may be predetermined, e.g., by the user. If the document is guaranteed, the broker 106 returns an acknowledgement to the dispatcher 204 to indicate successful receipt and storage of the document (S206). The dispatcher 204 returns the connection 208 to the connection pool 206. The integration server 102 returns control to the publishing service 202, which executes the next step (S207).

It is possible to configure publishable document types and the integration server 102 so that integration server 102 does not validate documents when they are published. Also, if a transient error occurs while the integration server 102 publishes a document, the audit subsystem may log the document and assign it a status of "FAILED." A transient error is an error that arises from a condition that might be resolved quickly, such as, for example, the unavailability of a resource related to network issues or failure to connect to a database. A monitor may be used to find and resubmit documents with a status of "FAILED."

Figure 3:
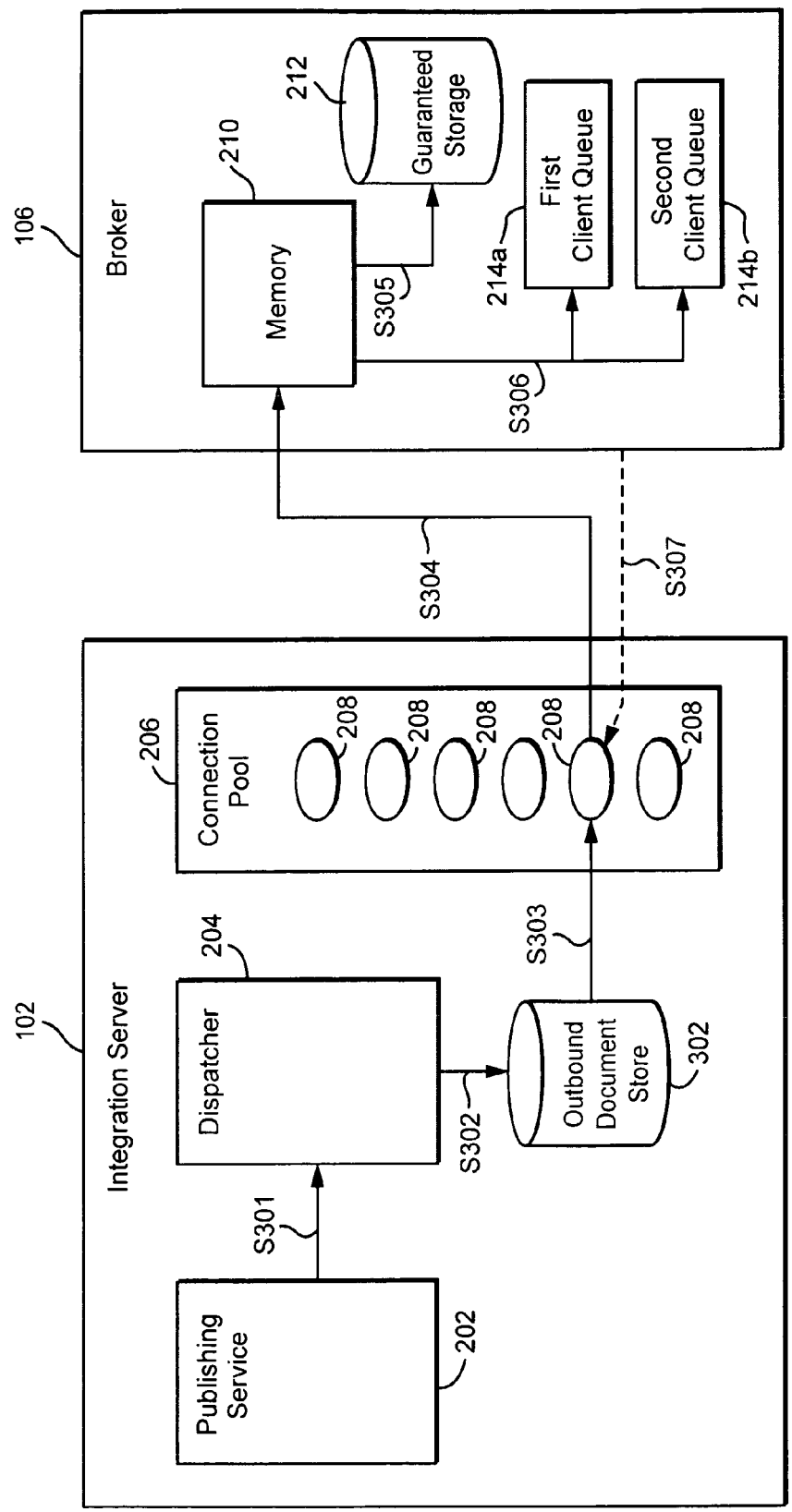
FIG. 3 is a block diagram that illustrates how the integration server publishes documents when the broker is not available.

FIG. 3 is a block diagram that illustrates how the integration server publishes documents when the broker is not available. In brief, the integration server 102 constantly monitors its connection 208 to the broker 106 and may alter the publishing path if it determines that the configured broker 106 is not available. If the broker 106 is not connected, the integration server 106 may route guaranteed documents to an outbound document store 302. The documents may remain in the outbound document store 302 until the connection 208 to the broker 106 is re-established.

A publishing service 202 provided to the integration server 102 sends a document to the dispatcher 204 (or an adapter notification publishes a document when an event occurs on the resource the adapter monitors) (S301). Before the integration server 102 sends the document to the dispatcher 204, it validates the document against its publishable document type. If the document is not valid, the service 202 returns an exception specifying the validation error. The dispatcher 204 detects that the broker 106 is not available. Accordingly, the document may be stored. For example, if the document is guaranteed, the dispatcher 204 routes the document to the outbound document store 302 (e.g., on disk). If the document is volatile, the dispatcher 204 discards the document and the publishing service 202 throws an exception. The integration server 102 executes the next step in the publishing service.

When the integration server 102 re-establishes a connection to the broker 106, the integration server 102 obtains a single connection 208 from the connection pool 206 (S303). The integration server 102 automatically sends the documents from the outbound document store 302 to the broker 106 (S304). To empty the outbound document store 302 more rapidly, the integration server 102 may send the documents in batches instead of one at a time. It will be appreciated that the integration server 102 may use a single connection 208 to empty the outbound document store 302, for example, to preserve publication order.

The broker 106 examines the storage type for the document, determines that it is guaranteed, and stores the document in memory 210 and on disk 212 (S305). The broker 106 routes the document to subscribers (S306). If the document was published (e.g., broadcast), the broker 106 identifies subscribers and places a copy of the document in the client queue for each subscriber (e.g., both first and second client queues 214a-b). If the document was delivered, the broker 106 places the document in the queue for the client specified in the delivery request (e.g., either first and second client queues 214a-b). If there are no subscribers for the document, the broker 106 returns an acknowledgement to the publisher 202 and then discards the document. If, however, a deadletter subscription exists for the document, the broker 106 deposits the document in the queue containing the deadletter subscription (e.g., either or both of first and second client queues 214a-b). A document remains in the queue (e.g., either or both of first and second client queues 214a-b) on the broker 106 until it is picked up by the subscribing client. If the time-to-live for the document elapses, the broker 106 discards the document. The time-to-live period may be predetermined, e.g., by the user. If the document is guaranteed, the broker 106 returns an acknowledgement to the dispatcher 204 to indicate successful receipt and storage of the document (S206). The dispatcher 204 returns the connection 208 to the connection pool 206. The broker 106 returns an acknowledgement to the integration server 102 to indicate successful receipt and storage of the guaranteed document (S307). The integration server 102 removes the document from the outbound document store 302.

If it is desirable to keep published documents from being placed in the outbound document store 302 when the broker 106 is unavailable, the integration server 102 can be configured to throw an exception instead. After the connection to the broker 106 is re-established, the integration server 102 may send all newly published documents (e.g., guaranteed and volatile) to the outbound document store 302 until the outbound store 302 has been emptied. This allows the integration server 102 to maintain publication order. After the integration server 102 empties the outbound document store 302, the integration server 102 may resume publishing documents directly to the broker 106.

If the integration server 102 makes a predetermined number of attempts (e.g., 3, 4, 5, etc.) to transmit a document from the outbound document store 302 to the broker 106 and all attempts fail, an audit subsystem may log the document and assign it a status of "TOO MANY TRIES." If a transient error occurs while the integration server 102 publishes a document, the audit subsystem may log the document and assign it a status of "FAILED." It is possible to configure publishable document types and the integration server 102 so that the integration server 102 does not validate documents when they are published. A monitor may be used to find and resubmit documents with a status of "TOO MANY TRIES" or "FAILED."

Figure 4:
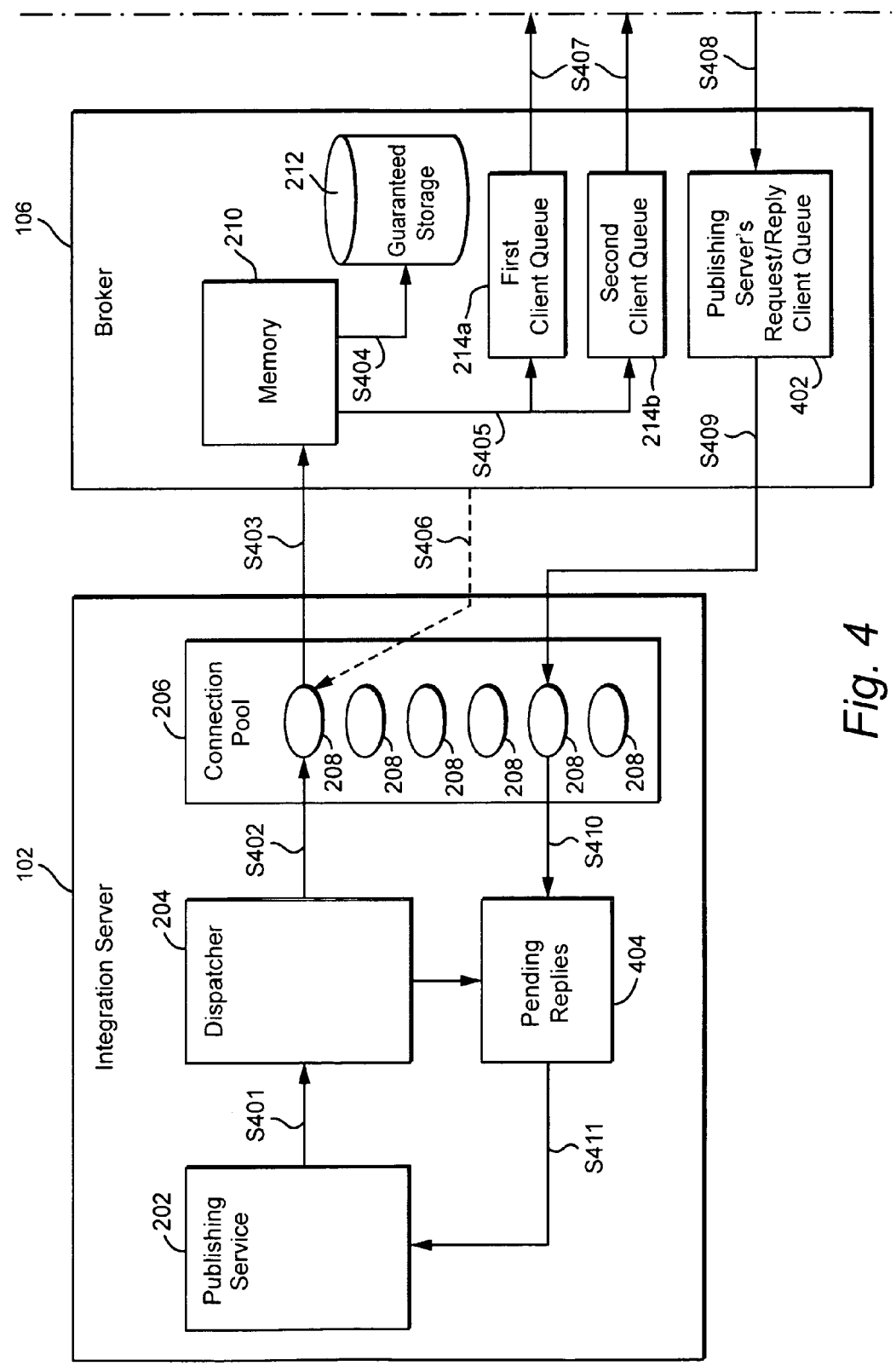
FIG. 4 is a block diagram that illustrates an integration server publishing a document to the broker and waiting for a reply when the request/reply is synchronous.

FIG. 4 is a block diagram that illustrates an integration server publishing a document to the broker and waiting for a reply when the request/reply is synchronous. In a publish-and-wait scenario, a service publishes a document (e.g., a request) and then waits for a reply document. This is sometimes called the request/reply model. A request/reply can be synchronous or asynchronous. In a synchronous request/reply, the publishing flow service stops executing while it waits for a response. When the service receives a reply document from the specified client, the service resumes execution. In an asynchronous request/reply, the publishing flow service continues executing after publishing the request document. That is, the publishing service does not wait for a reply before executing the next step in the flow service. The publishing flow service invokes a separate service to retrieve the reply document.

A publishing service 202 sends a document (e.g., the request) to the dispatcher 204 (S401). The integration server 102 populates a tag field in the document envelope with a unique identifier that will be used to match up the reply document with this request. The publishing service 202 enters into a waiting state. The service 202 will not resume execution until it receives a reply from a subscriber or the wait time elapses. The integration server 102 may begin tracking the wait time as soon as it publishes the document. Before the integration server 102 sends the document to the dispatcher 204, it may validate the document against its publishable document type. If the document is not valid, the service 202 may return an exception specifying the validation error. The service 202 may then unblock, but with an exception.

The dispatcher 204 obtains a connection from the connection pool 206 (S402). The connection pool 206 is a reserved set of connections 208 that the integration server 102 uses to publish documents to the broker 106. To publish a request document to the broker 106, the integration server 102 uses a connection 208 for the request/reply client. If the broker 106 is not available, the dispatcher 204 may route the document to the outbound document store 302, e.g., as described above. The dispatcher 204 sends the document to the broker 106 (S403).

The broker 106 examines the storage type for the document to determine how to store the document (S404). For example, if the document is volatile, the broker 106 stores the document in memory 210. If the document is guaranteed, the broker 106 stores the document in memory 210 and on disk 212. The broker 106 routes the document to subscribers (S405). If the document was published (e.g., broadcast), the broker 106 identifies subscribers and places a copy of the document in the client queue for each subscriber (e.g., both first and second client queues 214a-b). If the document was delivered, the broker 106 places the document in the queue for the client specified in the delivery request (e.g., either first and second client queues 214a-b). If there are no subscribers for the document, the broker 106 returns an acknowledgement to the publisher 202 and then discards the document. If, however, a deadletter subscription exists for the document, the broker 106 deposits the document in the queue containing the deadletter subscription (e.g., either or both of first and second client queues 214a-b). A document remains in the queue (e.g., either or both of first and second client queues 214a-b) on the broker 106 until it is picked up by the subscribing client. If the time-to-live for the document elapses, the broker 106 discards the document. The time-to-live period may be predetermined, e.g., by the user. If the document is guaranteed, the broker 106 returns an acknowledgement to the dispatcher 204 to indicate successful receipt and storage of the document (S406). The dispatcher 204 returns the connection 208 to the connection pool 206.

Subscribers retrieve and process the document (S407). A subscriber uses a service (not shown) to compose and publish a reply document. This service automatically populates the tag field of the reply document envelope with the same value used in the tag field of the request document envelope. This service also automatically specifies the requesting client as the recipient of the reply document. One or more subscribers send reply documents to the broker 106 (S408). The broker 106 stores the reply documents, e.g., in memory 210. The broker 106 places the reply documents in the request/reply client queue 402 for the integration server 102 that initiated the request.

The integration server 102 that initiated the request obtains a request/reply client from the connection pool 206 and retrieves the reply documents from the broker 106 (S409). The integration server 102 uses the tag value of the reply document to match up the reply with the original request (S410). The integration server 102 places the reply document in the pipeline of the waiting service 404 (S411). The waiting service resumes execution.

If the requesting service specified a publishable document type for the reply document, the reply document may be required to conform to the specified type. Otherwise, the reply document may be an instance of any publishable document type. It will be appreciated that a single request may receive many replies. The integration server 102 that initiated the request may use only the first reply document it retrieves from the broker 106. The integration server 106 may also discard all other replies. "First" may be arbitrarily defined. There may be no guarantee provided for the order in which the broker 106 processes incoming replies.

All reply documents may be treated as volatile documents. Volatile documents may be stored in memory 210 and may be lost if the resource on which the reply document is located shuts down or if a connection 208 is lost while the reply document is in transit.

If the wait time elapses before the service receives a reply, the integration server 102 may end the request, and the service may return a null document that indicates that the request timed out. The integration server 102 may execute the next step in the flow service. If a reply document arrives after the flow service resumes execution, the integration server 102 may reject the document and create a journal log message stating that the document was rejected because there is no thread waiting for the document. The publishable document types and the integration server 102 may be configured so that the integration server 102 does not validate documents when they are published.

When an integration server is connected to a broker, the path a document follows on the subscriber side includes, for example, retrieving the document from the broker, storing the document on the integration server, and processing the document. The subscription path for a document may depend on whether the document was published to all subscribers (e.g., broadcast) or delivered to an integration server directly.

Figure 5:
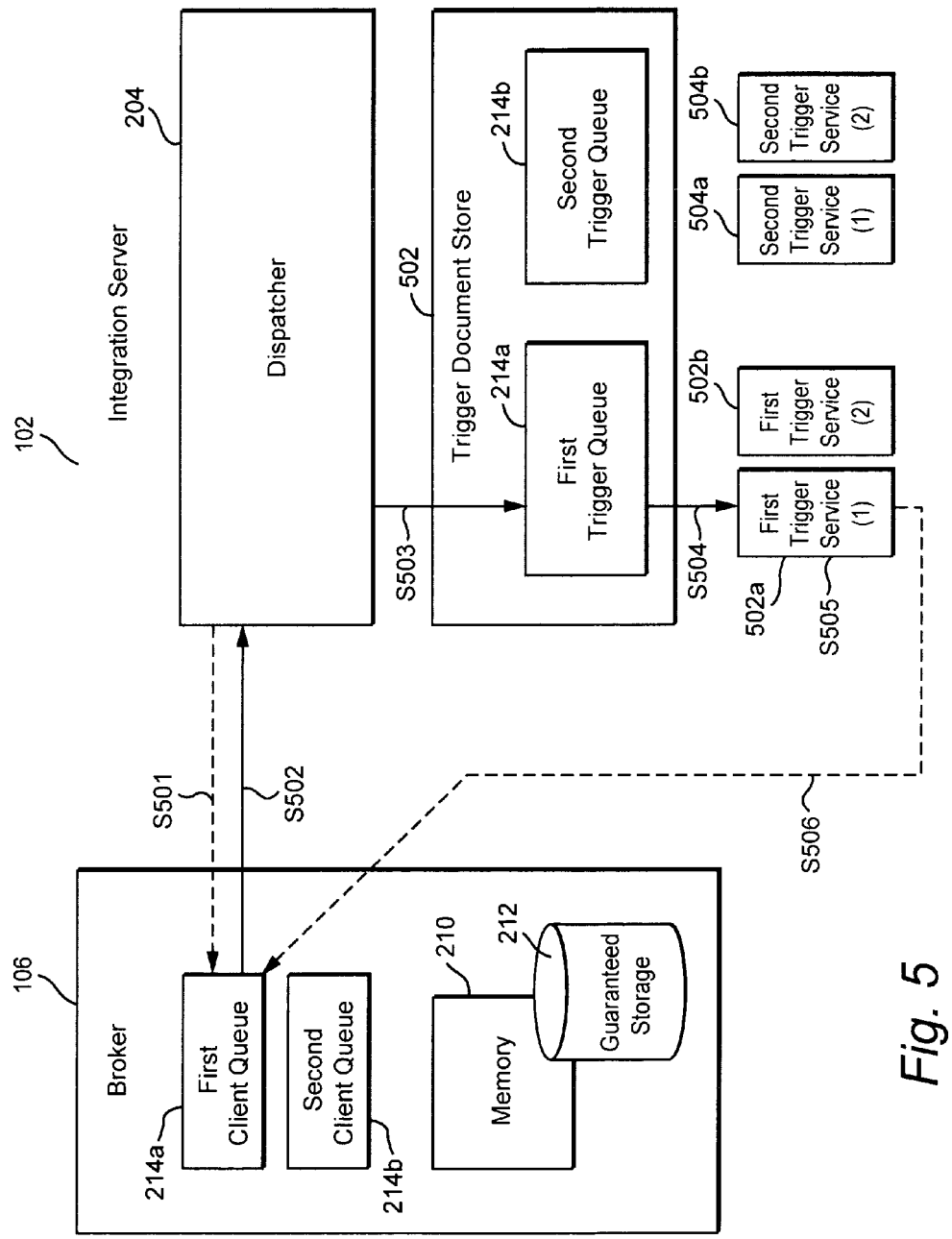
FIG. 5 is a block diagram that illustrates an integration server subscribing to a path for published documents.

FIG. 5 is a block diagram that illustrates an integration server subscribing to a path for published documents. When a document is published or broadcast, the broker places a copy of the document in the client queue for each subscribing trigger. Each subscribing trigger will retrieve and process the document.

The dispatcher 204 on the integration server 102 uses a server thread to request documents from a trigger's client queue 214a on the broker 106 (S501). It will be appreciated that each trigger on the integration server 102 may have a corresponding client queue on the broker 106. The thread retrieves a batch of documents for the trigger (S502). The dispatcher 204 places the documents in the trigger's queue 214a in the trigger document store 502 (S503). The trigger document store 502 may be saved in memory 210, for example. The dispatcher 204 then releases the server thread used to retrieve the documents.

The dispatcher 204 obtains a thread from the server thread pool (not shown), pulls a document from the trigger queue 214a, and evaluates the document against the conditions in the trigger (S504). If exactly-once processing is configured for the trigger, the integration server 102 may first determine whether the document is a duplicate of one that has already been processed by the trigger. In such a case, the integration server 102 may continue processing the document only if the document is new.

If the document matches a trigger condition, the dispatcher 204 executes the trigger service 502a/502b associated with that condition (S505). If the document does not match a trigger condition, the integration server 102 may discard the document, return an acknowledgement to the broker 106, and return the server thread to the server thread pool. The integration server 102 also may generate a journal log message stating that the document did not match a condition.

The trigger service executes to completion (e.g., to success or error) (S506). If the trigger service 502a executed successfully, the integration server 102 returns an acknowledgement to the broker 106 (e.g., if this is a guaranteed document). The integration server 102 then removes the copy of the document from the trigger queue 214a and returns the server thread to the thread pool. If a service exception occurs, the trigger service 502a ends in error and the integration server 102 rejects the document. If the document is guaranteed, the integration server 102 returns an acknowledgement to the broker 106. The integration server 102 removes the copy of the document from the trigger queue 214a, returns the server thread to the thread pool, and sends an error document to indicate that an error has occurred. If a transient error occurs during trigger service execution and the service catches the error, wraps it and re-throws it as an exception, then the integration server 102 waits for the length of the retry interval (which may be predetermined and/or user-specified) and re-executes the service using the original document as input. If the integration server 102 reaches the maximum number of retries (which also may be predetermined and/or user-specified) and the trigger service 502a still fails because of a transient error, the integration server 102 treats the last failure as a service error.

After receiving an acknowledgement, the broker 106 may remove its copy of the document from guaranteed storage 212. The integration server 102 may return an acknowledgement for guaranteed documents only. If the integration server 102 shuts down or reconnects to the broker 106 before acknowledging a guaranteed document, the integration server 102 may recover the document from the broker 106 when the server restarts or the connection is re-established. Thus, the documents may be redelivered. If a trigger service generates audit data on an error and includes a copy of the input pipeline in the audit log, a monitor may be used to re-invoke the trigger service at a later time.

It is possible that a document could satisfy more than one condition in a trigger. However, the integration server 102 may execute only the service associated with the first satisfied condition. The processing mode for a trigger determines whether the integration server 102 processes documents in a trigger queue serially or concurrently. In serial processing, the integration server 102 processes the documents one at a time in the order in which the documents were placed in the trigger queue. In concurrent processing, the integration server 102 processes as many documents as it can at one time, but not necessarily in the same order in which the documents were placed in the queue. It will be appreciated that in concurrent processing, the integration server 102 may process a number of documents in dependence on the maximum availability of threads, which may be configured by a user in certain example embodiments.

If a transient error occurs during document retrieval or storage, the audit subsystem may log the document and assign it a status of "FAILED." A transient error is an error that arises from a condition that might be resolved later, such as, for example, the unavailability of a resource related to network issues or failure to connect to a database. A monitor may be used to find and resubmit documents with a status of "FAILED." Also, a trigger may be configured to suspend and retry at a later time if retry failure occurs. Retry failure occurs when the integration server 102 makes the maximum number of retry attempts and the trigger service still fails because of an exception.

Figure 6:
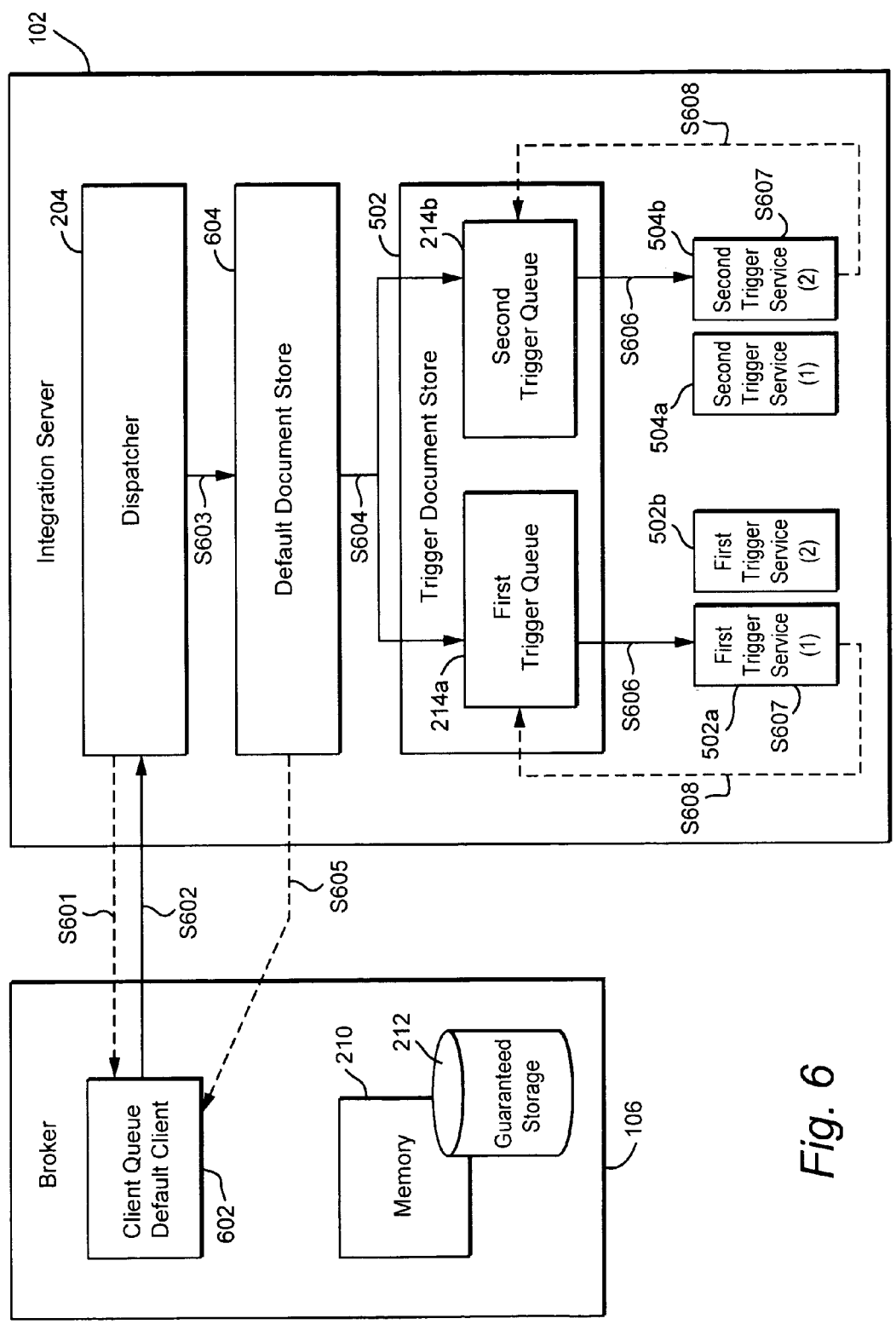
FIG. 6 is a block diagram that illustrates an integration server subscribing to a path for documents delivered to the default client.

FIG. 6 is a block diagram that illustrates an integration server subscribing to a path for documents delivered to the default client. A publishing service can deliver a document by specifying the destination of the document. For example, the publishing service may specify the broker client that is to receive the document. When the broker receives a delivered document, it places a copy of the document in the queue for the specified client only. Typically, documents are delivered to the default client. The default client is the broker client created for the integration server when the integration server first configures its connection to the broker. It will be appreciated that if a publishing service specifies an individual trigger as the destination of the document (e.g., the publishing service specifies a trigger client ID as the destination ID), the subscribe path the document follows is the same as the path followed by a published document.

The dispatcher 204 provided to the integration server 102 requests documents from the default client's queue on the broker 106 (S601). It will be appreciated that the default client may be the broker client created for the integration server 102. The broker 106 places documents in the default client's broker queue 602 only if the publisher delivered the document to the integration server's client ID. The thread retrieves documents delivered to the default client in batches (S602). The number of documents the thread retrieves at one time is determined by, for example, the capacity and refill level of the default document store and the number of documents available for the default client on the broker 106.

The dispatcher 204 places a copy of the documents (e.g., in memory) in the default document store 604 (S603). The dispatcher 204 identifies subscribers to the document and routes a copy of the document to each subscriber's trigger queue 214a-b (S604). In the case of delivered documents, the integration server 102 saves the documents to a trigger queue 214a-b. The trigger queues 214a-b are located within a trigger document store 502, which may be saved on disk. The integration server 102 removes the copy of the document from the default document store 604 and, if the document is guaranteed, returns an acknowledgement to the broker 106 (S605). The broker 106 removes the document from the default client's queue 602.

The dispatcher 204 obtains a thread from the server thread pool, pulls the document from the trigger queue 214a-b, and evaluates the document against the conditions in the trigger (S606). If exactly-once processing is configured for the trigger, the integration server 102 first determines whether the document is a duplicate of one already processed by the trigger. The integration server 102 continues processing the document only if the document is new.

If the document matches a trigger condition, the integration server 102 executes the trigger services 502a, 504b associated with that condition (S607). If the document does not match a trigger condition, the integration server 102 sends an acknowledgement to the trigger queue 214a-b, discards the document (e.g., removes it from the trigger queue 214a-b), and returns the server thread to the server thread pool. The integration server 102 also generates a journal log message stating that the document did not match a condition.

The trigger service executes (e.g., to success or error) (S608). If the trigger services 502a, 504b executed successfully, the integration server 102 returns an acknowledgement to the trigger queue 214a-b (e.g., if this is a guaranteed document), removes the document from the trigger queue 214a-b, and returns the server thread to the thread pool. If a service exception occurs, the trigger service 502a, 504b ends in error and the integration server 102 rejects the document, removes the document from the trigger queue 214a-b, returns the server thread to the thread pool, and sends an error document to indicate that an error has occurred. If the document is guaranteed, the integration server 102 may return an acknowledgement to the trigger queue 214a-b. The trigger queue 214a-b removes its copy of the guaranteed document from storage. If a transient error occurs during trigger service execution and the service catches the error, wraps it and re-throws it as an exception, then the integration server 102 waits for the length of the retry interval and re-executes the service using the original document as input. If the integration server 102 reaches the maximum number of retries and the trigger service still fails because of a transient error, the integration server 102 treats the last failure as a service error.

The integration server 102 may save delivered documents in a trigger document store 502, which may be located on disk. The integration server 102 may save published documents in a trigger document store 502, which may be in memory. If the integration server 102 shuts down before processing a guaranteed document saved in a trigger document store on disk, the integration server may recover the document from the trigger document store 502 when it restarts. Volatile documents may be saved in memory and thus may not be recovered upon restart.

If a service generates audit data on error and includes a copy of the input pipeline in the audit log, a monitor may be used to re-invoke the trigger service at a later time. As above, it is possible that a document could match more than one condition in a trigger. However, the integration server 102 executes only the service associated with the first matched condition.

The processing mode for a trigger may determine whether the integration server 102 processes documents in a trigger queue serially or concurrently. In serial processing, the integration server 102 processes the documents one at a time in the order in which the documents were placed in the trigger queue. In concurrent processing, the integration server 102 processes as many documents as it can at one time, but not necessarily in the same order in which the documents were placed in the queue.

If a transient error occurs during document retrieval or storage, the audit subsystem logs the document and assigns it a status of "FAILED." A monitor may be used to find and resubmit documents with a "FAILED" status. A trigger may be configured to suspend and retry at a later time if retry failure occurs. Retry failure occurs when the integration server makes the maximum number of retry attempts and the trigger service still fails because of an exception.

Figure 7:
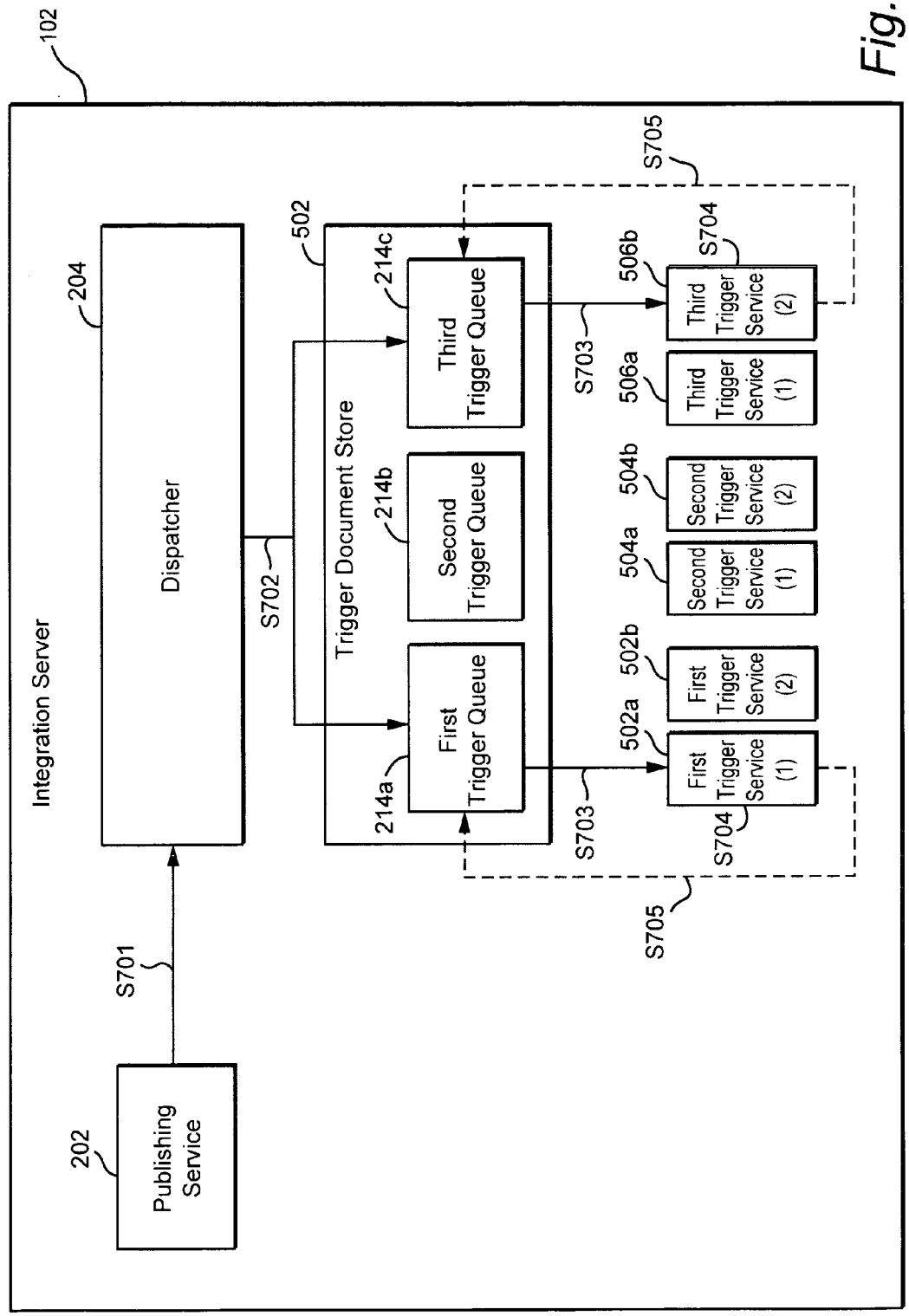
FIG. 7 is a block diagram that illustrates the publish and subscribe paths for a locally published document.

FIG. 7 is a block diagram that illustrates the publish and subscribe paths for a locally published document. Local publishing refers to the process of publishing a document within the integration server. In such a case, only subscribers located on the same integration server can receive and process the document. In local publishing, the document remains within the integration server. There is no broker involvement. Local publishing occurs when the service that publishes the document specifies that the document should be published locally or when the integration server is not configured to connect to a broker.

A publishing service 202 provided to the integration server 102 sends a document to the dispatcher 204 (S701). Before the integration server 102 sends the document to the dispatcher 204, it validates the document against its publishable document type. If the document is not valid, the service returns an exception specifying the validation error. The dispatcher 204 either determines which triggers subscribe to the document and place a copy of the document in each subscriber's trigger queue 214a/214b/214c, saving locally published documents in a trigger document store 502 (e.g., located on disk) or, if there are no subscribers for the document, discards the document (S702).

The dispatcher 204 obtains a thread from the server thread pool, pulls the document from the trigger queue 214a/214b/214c, and evaluates the document against the conditions in the trigger (S703). If exactly-once processing is configured for the trigger, the integration server 102 first determines whether the document is a duplicate of one already processed by the trigger. The integration server 102 continues processing the document only if the document is new. If the document matches a trigger condition, the dispatcher 204 executes the trigger service 502a/502b/504a/504b/506a/506b associated with that condition (S704). If the document does not match a trigger condition, the integration server 102 sends an acknowledgement to the trigger queue 214a/214b/214c, discards the document (e.g., removes it from the trigger queue 214a), and returns the server thread to the server thread pool.

The trigger service executes to completion (e.g., to success or error) (S705). If the trigger service 502a/502b/504a/504b/506a/506b executed successfully, the integration server 102 sends an acknowledgement to the trigger queue 214a/214b/214c (e.g., if this is a guaranteed document), removes the document from the trigger queue 214a/214b/214c, and returns the server thread to the thread pool. If a service exception occurs, the trigger service 502a/502b/504a/504b/506a/506b ends in error and the integration server 102 rejects the document, removes the document from the trigger queue 214a/214b/214c, and returns the server thread to the thread pool. If the document is guaranteed, the integration server 102 sends an acknowledgement to the trigger queue 214a/214b/214c. If a transient error occurs during trigger service execution and the service catches the error, wraps it and re-throws it as an exception, then the integration server 102 waits for the length of the retry interval and re-executes the service using the original document as input. If the integration server 102 reaches the maximum number of retries and the trigger service 502a/502b/504a/504b/506a/506b still fails because of a transient error, the integration server 102 treats the last failure as a service error.

It is possible to configure publishable document types and the integration server 102 so that the integration server 102 does not validate documents when they are published. The integration server 102 may save locally published documents in a trigger document store 502, which may be located on disk. If the integration server 102 shuts down before processing a locally published guaranteed document, the integration server may recover the document from the trigger document store 502 when it restarts. The integration server may not recover volatile documents when it restarts. If a service generates audit data on error and includes a copy of the input pipeline in the audit log, a monitor may be used to re-invoke the trigger service at a later time.

It is possible that a document could match more than one condition in a trigger. However, the integration server 102 may execute only the service associated with the first matched condition. The processing mode for a trigger determines whether the integration server 102 processes documents in a trigger queue serially or concurrently. In serial processing, integration server 102 processes the documents one at a time in the order in which the documents were placed in the trigger queue. In concurrent processing, the integration server 102 processes as many documents as it can at one time, but not necessarily in the same order in which the documents were placed in the queue. It also is possible to configure a trigger to suspend and retry at a later time if retry failure occurs. Retry failure occurs when the integration server 102 makes the maximum number of retry attempts and the trigger service still fails because of an exception.

An overview of the steps for building a publish-and-subscribe solution is now provided. In brief, on the publishing side, a user creates publishable document types for the documents that are to be published and services to process the incoming documents that are published by the publishing side. On the subscribing side, the user creates services that publish the documents and triggers that associate the incoming documents with services that process the documents.

In greater detail, a first step to building an integration solution involves defining the problem and determining how to solve the problem using the publish-and-subscribe model. When designing the solution, it may be helpful to determine the documents that will need to be published/subscribed to. This information is helpful when creating the publishable document types. Similarly, it also may be helpful to determine how the documents ought to be published. This information is helpful when creating the services that publish the documents. Finally, it may be helpful to determine how to process the documents. This information is helpful when creating the services that process the documents.

In a second step, the production configuration is determined. In some cases, it may be desirable for the development environment to mirror the production environment. Issues to consider include whether all of the document publishing and subscribing will be performed on a single integration server or whether multiple integration servers will be used; if multiple integration servers are used, whether a cluster will be configured; and whether a broker will be used in the production environment. In a third step, the publishable document type(s) is/are created. That is, after the documents that will be published are determined, on the publishing side, the publishable document types are created.

In a fourth step, the publishable document types are made available. To create services that process documents and triggers that subscribe to documents, the subscribing side generally needs the publishable document types that define the documents that will be published. When the development environment is a single integration server, the publishing side and the subscribing side are developed on the single integration server. Thus, in general, no actions are needed to make the publishable document types available to other developers. After the publishable document type for the publishing side is created, the publishable document type is immediately available for the subscribing side to use. However, when the development environment includes multiple integration servers with a broker, the publishing side and subscribing side each are developed on separate integration servers connected by a broker. Thus, when the publishable document type is created, a corresponding broker document type is automatically created on the broker. Publishable document types may be made available to other developers. This may be made possible by creating a publishable document type from the broker document type. It also may be made possible by using package replication to distribute publishable document types to developers working with other integration servers. In this case, when other developers receive the package, they may install the package and then synchronize the document types by pulling them from the broker.

In a fifth step, on the publishing side, the services that will publish the documents to the broker or locally on the same integration server are created. In a sixth step, on the subscribing side, the services that will process the incoming documents are created. When creating a service to process a document, a document reference may be included in the input signature to the publishable document type for the published document. In this way, it is possible to reference the data in the document using the fields defined in the publishable document type.

In a seventh step, the triggers are defined. On the subscribing side, triggers are created to associate one or more publishable document types with the service that processes the published documents. To associate a publishable document type with the service, a condition in the trigger can be created that identifies the publishable document type being subscribing to and the service to invoke when a document of that type arrives. It is possible to further refine the condition by adding filters that specify criteria for the contents of a published document. When the trigger is saved, the integration server uses the conditions in the trigger to define subscriptions to publishable document types. Further details on trigger design and configuration are provided below.

Figure 8:
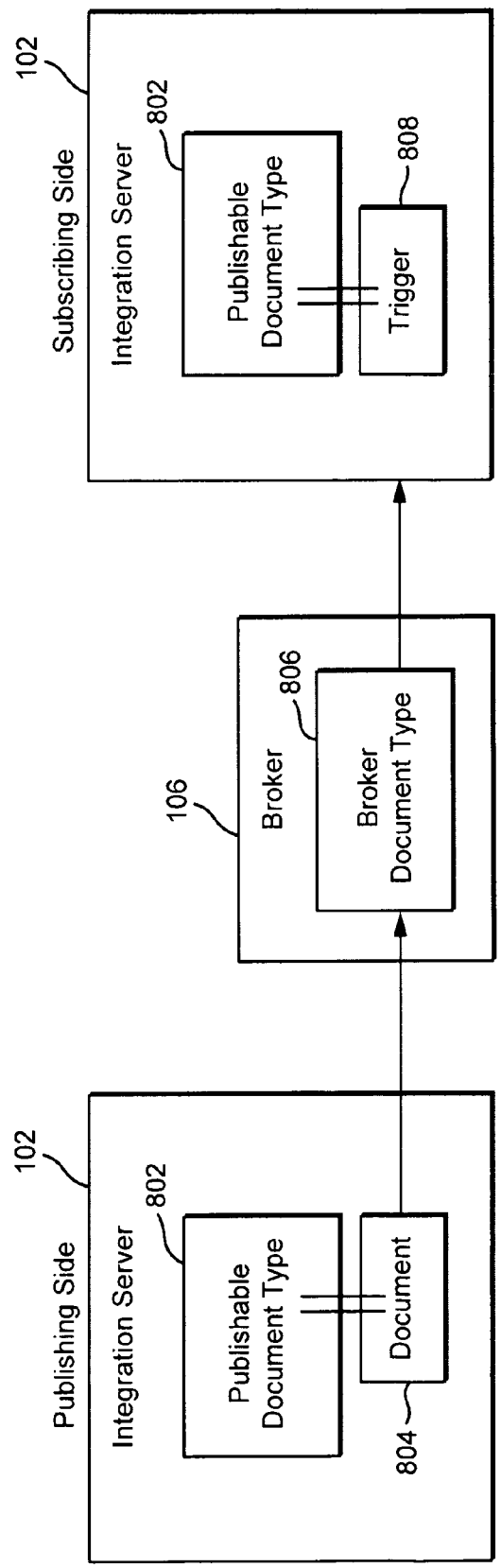
FIG. 8 shows the two sides of a publish-and-subscribe model integration solution, with publishable document types being associated with the same broker document type.

In an eighth step, the publishable document types are synchronized. When a broker is included in the integration solution, each publishable document type has a corresponding broker document type on the broker. FIG. 8 shows the two sides of a publish-and-subscribe model integration solution, with publishable document types being associated with the same broker document type. In a publish-and-subscribe integration solution, both the publishing side and the subscribing side use the same publishable document type 802. The publishing side uses the publishable document type 802 when publishing the document 804 to the broker 106 to identify the type of document being published. The subscribing side references the publishable document type 802 in the trigger 808 to indicate the type of document being subscribed to. For the integration solution to work correctly, the publishable document type 802 on the publishing side and the subscribing side should reference the same broker document type 806.

The following describes how to make a publishable document type correspond to the same broker document type based on the development environment. Where the development environment involves one integration server, when the integration solution is moved into production, the publishing side and subscribing side may be on different integration servers that are connected by a broker. Thus, it may be necessary to synchronize to create the broker document types associated with the publishable document types. Accordingly, on the publishing side, during synchronization, the publishable document types are pushed to the broker to create the broker document type on the broker. Package replication may be used to create and distribute packages containing the publishable document types. On the subscribing side, the package containing publishable document types created by the publisher is installed. During synchronization, document types are pulled from the broker to update the publishable document types.

Where the development environment involves multiple integration servers with a broker, because the broker was used during development, the publishable document types on both the publishing side and subscribing side may already correspond to the same broker document types. Nevertheless, a simple synchronization of all document types may be used to ensure that the publishable document types are synchronized with broker document types.

Further details regarding triggers will now be provided. Triggers establish subscriptions to publishable document types and specify how to process instances of those publishable document types. When a trigger is built, one or more conditions are created. A condition associates one or more publishable document types with a single service. The publishable document type acts as the subscription piece of the trigger. The service is the processing piece. When the trigger receives documents to which it subscribes, the integration server processes the document by invoking the service specified in the condition.

Building a trigger is a process that involves the following basic stages. A new trigger on the integration server is created. During this stage, the new trigger is created on the integration server where development and testing will be performed. One or more conditions for the trigger are created. During this stage, publishable document types are associated with services, filters to be applied to incoming documents are created, and join types are selected. Trigger properties are set. During this stage, parameters that configure the run-time environment of this trigger are set, such as, for example, trigger queue capacity, document processing mode, trigger service retry limit, and exactly-once processing. Testing and debugging may be performed on the trigger.

The service that processes a document received by a trigger is called a trigger service. A condition generally specifies a single trigger service. Before a trigger can be enabled, the trigger service must already exist on the same integration server. Additionally, the input signature for the trigger service needs to have a document reference to the publishable document type. The name for this document reference is the fully qualified name of the publishable document type. The fully qualified name of a publishable document type may conform to a set format, such as, for example: folder.subfolder:PublishableDocumentTypeName.

When a trigger is saved, the integration server may evaluate the trigger and specifically, the conditions in the trigger, to make sure that the trigger is valid. If the integration server determines that the trigger or a condition in the trigger is not valid, an error message may be displayed to the user and the trigger may be disabled. In certain implementations, a trigger may be considered valid when each of the following is true: the trigger contains at least one condition; each condition in the trigger specifies a unique name; each condition in the trigger specifies a service; each condition in the trigger specifies one or more publishable document types; if multiple conditions in the trigger specify the same publishable document type, the filter applied to the publishable document type is the same in each condition; the syntax of a filter applied to a publishable document type is correct; and the trigger contains no more than one join condition.

In general, a trigger can subscribe to publishable document types only. Multiple triggers (and multiple conditions within a trigger) can reference the same publishable document type. At run time, for each trigger, the integration server invokes the service specified for the first condition that matches the publishable document type criteria.

Figure 9:
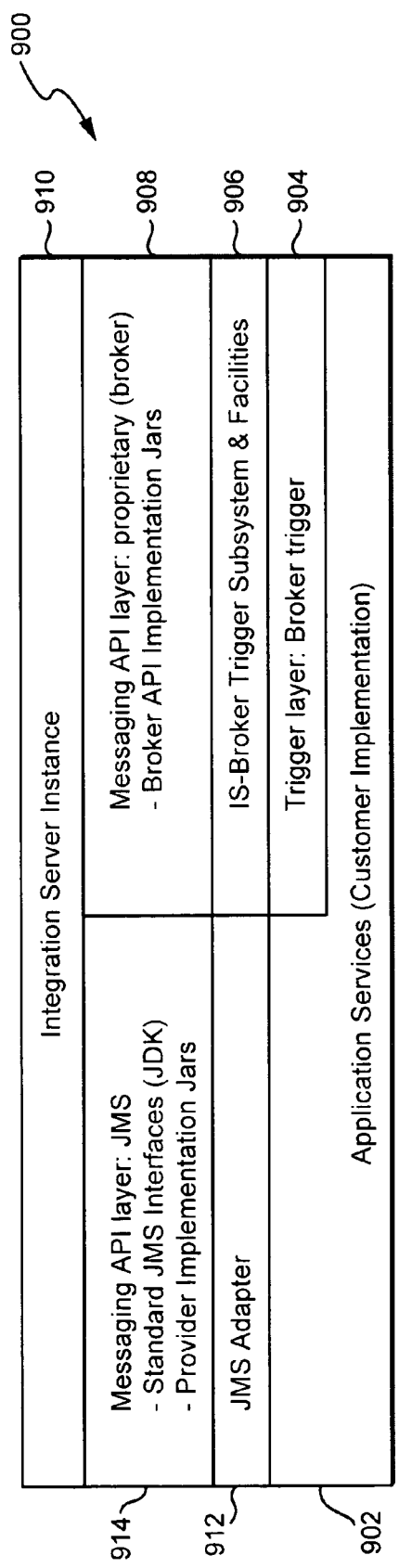
FIG. 9 is an illustrative block diagram representing the current messaging layer.

FIG. 9 is an example block diagram representing the current messaging layer 900 that provides communications among, between, and with components the above-described system. Certain aspects of the messaging layer 900 may sit on both the integration server (or an instance of the integration server) and the broker as separate implementations, and/or it could be present on any provider, in certain example embodiments. In the messaging layer 900, application services 902 are provided as customer implementations. A messaging provider (e.g., a broker functioning in a proprietary or a JMS mode, another JMS provider) optionally may be distinguished from the clients that access the provider. In such cases, the clients can be an integration server or a custom program or application, e.g., that embeds the providers' client libraries. Such client libraries may include the JAR files included in the messaging API layer (e.g., the broker API and/or the JMS API). In certain example embodiments, high layers of the messaging layer (e.g., the JMS adapter and the trigger layers, through the application code) may reside on the integration server.

The trigger layer 904 enables the above-described broker trigger services, which interact with the integration server broker trigger subsystem and facilities 906 as described above. These layers enable access to the proprietary (e.g., broker) messaging API layer 908. The broker API may be distributed and/or implemented via JAR files. Thus, the right side of the messaging layer 900 provides a rich set of features that may interact with an integration server or integration server instance 910 through proprietary messaging layers to provide an application integration solution.

As noted above, to provide interoperability and/or communications over an open, standards-based messaging protocol, appropriate messaging protocols (e.g., JMS messaging) may be enabled through the use of an adapter. Thus, on the left side of the messaging layer 900, a JMS adapter layer 912 is provided to interface with the JMS API layer 914, which may be enabled using the standard JMS interfaces provided by the JDK. Thus, the left side of the messaging layer 900 provides interoperable and/or open messaging features that may interact with an integration server instance 910 through the MS-related layers to provide an application integration solution.

As will be readily appreciated from FIG. 9, the current messaging layer 900 does not include a trigger subsystem for the left side of the messaging protocol. Thus, applications built on the JMS adapter lack the extended capabilities of the broker trigger subsystem. As such, with the current messaging layer 900, users were forced to choose between interoperability and standards-based messaging and processing on the one hand, and more powerful, proprietary messaging and processing on the other.

The solution to this problem implemented in certain example embodiments involves fully embedding JMS as a peer to the proprietary messaging protocol in the integration server trigger subsystem so that all or substantially all existing capabilities would be JMS-enabled.

Figure 10:
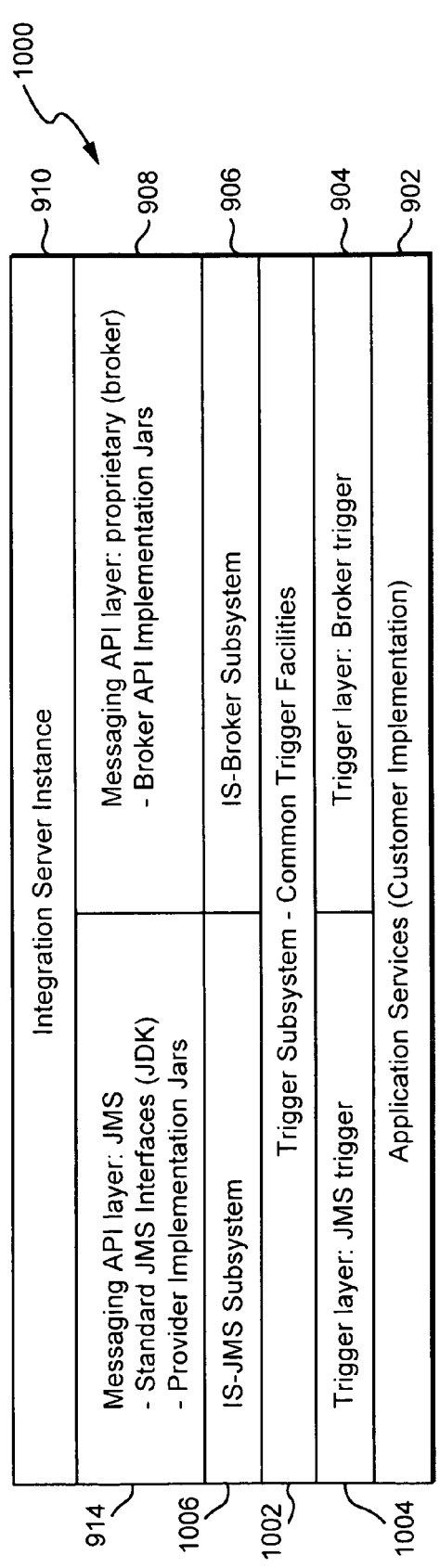
FIG. 10 is an illustrative block diagram representing a messaging layer in accordance with an example embodiment.

Accordingly, FIG. 10 is an illustrative block diagram representing a messaging layer 1000 in accordance with an example embodiment. As in the message layer of FIG. 9, this messaging layer 1000 of certain example embodiments may sit on both the integration server (or an instance of the integration server as shown in FIG. 10) and the broker as separate implementations (which is not the case shown in FIG. 10). It could be present on any provider, such as, for example, one that supports JMS messaging. However, through the use of the messaging layer 1000 of certain example embodiments, JMS messaging may be enabled without the use of a special adapter provided to the integration server. Furthermore, in certain example embodiments, such a messaging layer 1000 may make it possible to avoid making any changes to the JMS trigger itself (e.g., may enable standard JMS messages in a regular format to be used) and/or may reduce the need for custom programming and/or implementation at the application service level in certain example cases.

As will be appreciated from FIG. 10, the left side of the messaging layer 1000 essentially mirrors the right side thereof. In particular, a JMS trigger layer 1004 is provided as a counterpart to the broker trigger layer 904, and a JMS subsystem 1006 (which helps take the place of the JMS adapter 912) is a counterpart to the broker trigger subsystem 906. The same JMS messaging API layer 914 and proprietary broker messaging API layer 908 are still provided. However, there is included in the messaging protocol 1000 a trigger subsystem 1002 which provides common trigger facilities. Trigger subsystem 1002 is provided as a value-added layer above individual trigger subsystems, thereby enabling the parallel subsystems to function.

Certain example embodiments enable the trigger subsystem 1002 by taking one or more of the following specific measures. First, the integration server trigger namespace entity is extended and adapted to include properties and settings specific to JMS messaging. The trigger namespace is a named object that enables configuration regarding how long to wait for messages and how to process such messages when they are received. It may be organized, for example, as a named hierarchy of folders. For example, the following construct represents an instruction as to how a business application should process order documents as they are received: bussapp.processpo:handlineincomingprocessingorder. The namespace may be organized as a tree, and configuration may be performed at the node level.

Second, the integration server trigger administration capabilities are extended and adapted to include options specific to JMS (e.g., an alternate throttling scheme). Such administrative capabilities are useful in regulating the flow of messages into the system (e.g., to reduce the chances of the system becoming overwhelmed). Administration may be performed globally and/or on the trigger level. Example functionality includes regulating/suspending trigger acceptance and/or processing.

Third, the integration server trigger clustering model is extended and adapted for JMS. It will be appreciated that clustering, e.g., as provided behind a load-balancer, may provide for increased scalability and survivability. In certain example embodiments, the same trigger may be used on one or more integration servers.

Fourth, the integration server trigger join mechanism is extended and adapted for JMS. In a join operation, a trigger waits for multiple documents if the process calls for the processing of all documents at once. Fifth, the integration server trigger ordered service execution mechanism is extended and adapted for JMS. The ordered service execution guarantees in-order processing if multiple documents are involved. Sixth, implementation of integrated transaction handling is provided for the trigger subsystem for JMS messages. Transaction handling involves tying a processing sequence to a transaction. The processing sequence may then be committed as a whole transaction, or changes may be rolled back if any operation in the transaction fails.

Also, in certain example embodiments, certain custom extensions are provided for cases where the broker is used as the JMS provider itself. For example, a single-step (e.g., JNDI) configuration, multi-server failover (e.g., shared client mode), and/or streaming large-message processing may be enabled. Indeed, the configuration capabilities provided by certain example embodiments simplify the custom programming and implementation requirements of the current techniques. For example, certain example embodiments provide a menu-based configuration tool as compared to requiring actual programming.

The standard flow for message processing involves pre-processing, processing, and post-processing. Pre-processing involves message retrieval and evaluation, which may include, for example, cluster support, duplicate detection, transaction initiation, and the like. Processing involves service dispatch, which may include, for example, local filter processing, concurrency of application, join and ordered service execution evaluation, and the like. Post-processing involves message acknowledgement, which may include, for example, error and retry handling, transaction completion, and the like.

These configuration techniques provide certain illustrative advantages. For example, because message handling and processing is addressed through triggers, the capabilities built into the integration sever can be leveraged. Because the trigger construct of certain example embodiments is unique, so too is the JMS-based delivery mechanism. Moreover, even though the conventional broker provides the rich feature set through a proprietary protocol with reduced interoperability and JMS messaging provides interoperability with reduced features, certain example embodiments provide both interoperability over standards-based messaging protocol and a powerful feature set. Thus, providing an extension to messaging layer reduces (and sometimes eliminates) the need for custom development of messaging layers, adapters, and/or applications using such custom messaging layers and/or adapters. As such, it is possible to avoid repeated recoding which often is done in a non-standard way, with the same and further functionality instead being provided in a configuration-based manner.

Thus, the general advantages include richly enhanced, fully interoperable standards-based (e.g., JMS-based) message processing, the ability to use alternate (e.g., JMS) messaging providers in addition to or in place of the proprietary broker, and the ability to connect to more than one messaging provider simultaneously (e.g., one broker and/or any number of JMS providers). Specific illustrative advantages provided by the trigger subsystem may include in certain example implementations declarative configuration of listeners for one or more JMS destinations (e.g., queues or topics), configured concurrency for server load control (e.g., threads may be available per-trigger and/or globally), global and per-trigger runtime administration (e.g., monitoring, suspension and resumption, capacity management, etc.), once-and-only-once processing (e.g., guaranteed processing, duplicate detection, error retry, etc.), automated transient error handling and recovery (e.g., for temporarily unavailable backend applications), cluster support for message processing (e.g., providing scalability, availability, and failover features), stream-based messaging for large documents (e.g., to reduce memory overload), conditional message processing based on joins (such as or, and, xor) which are useful in business process model execution, ordered service execution for sequences of ordered messages, integrated local and XA transaction support, client-side queuing for messaging (e.g., to support JMS provider unavailability), local filters (e.g., beyond limited JMS selector capability), etc.

Although the brokers of certain example embodiments described above are advantageous, further improvements are still possible. For example, it will be appreciated that the broker could be improved so as to offer an extensible load balancing feature. Indeed, the inventors of the instant application have taken note that customers have been requesting failover and load balancing features for their broker applications for the past several years. Accordingly, the brokers of certain example embodiments implement client-side failover and load balancing functions. The load balancing functions of certain example embodiments may reside within the application space and also may be scalable.

More particularly, the above-mentioned load balancing feature may work with a set of brokers referred to herein as a broker cluster. Publishers and subscribers may connect to a broker cluster, and the brokers in the broker cluster may share the message routing from publishers to subscribers. For example, a publisher may in certain example instances select any of the brokers running in the broker cluster to publish a message, and a subscriber may be able to receive the same message from that broker.

In certain example embodiments, the load balancing features may be implemented as an extension to the JMS broker API described in detail above. Furthermore, certain example embodiments advantageously may enable the monitoring and tracking of load balancing traffic data, e.g., through a plugged-in tool or database. For example, a JMS API logger may be used to log messages. Logged messages may or may not be visualized or calculated for monitoring purpose. It will be appreciated that other implementations also are possible and that the present invention is not limited to this or any particular implementation.

The load balancing functions of certain example embodiments may advantageously allow user applications to increase system throughput, e.g., in the case of a fast publisher and slow subscriber(s). In such a case, for example, a publisher may connect to multiple clustered brokers, publishing documents according to a publishing policy (e.g., round-robin, etc.), and all subscribers may connect to all the brokers in the cluster. Multiple subscribers may share the messaging processing load, thereby enhancing the performance of the overall system. Additionally, if one of the brokers goes down (e.g., becomes unavailable, exceeds capacity, or otherwise fails, etc.), other brokers may take over the messaging distribution. Therefore, it can be seen that this example implementation also may provide a client-side failover function over a broker cluster. When there are multiple publishers of the same messages, this example implementation may also help to balance the work load of the publishers and offer failover support at the same time. Messaging distribution based on topics and broker traffic load within a broker cluster also may be supported in certain example embodiments.

The failover feature of certain example embodiments may be able to address both active/active and active/passive failover patterns in a limited way. That is, when the entire cluster of brokers share the message distribution with a round robin policy, for example, an active/active failover is achieved. When the brokers distribute messages based on a sticky algorithm, for example, in that the next broker takes over the message distribution only when the previous broker is down, an active/passive failover may be enforced. In certain example embodiments, if a failover occurs, documents that are already in a failed broker may remain in the particular broker queues until the particular broker functionality is restored.

The load balancing features of certain example embodiments may be implemented with subclasses that extend the existing JMS connection, session, and client classes. For example, when an application creates a JMS connection with a cluster connection factory, a cluster connection instance may be created. This connection may initiate multiple physical connections with the clustered brokers. When a session is created on a cluster connection, multiple cluster sessions may be populated based on the physical connections. The JMS connection implementation may handle one socket connections to one broker, multiple physical connections to different brokers merging the cluster connection functions into the generic connection, etc.

Figure 11:
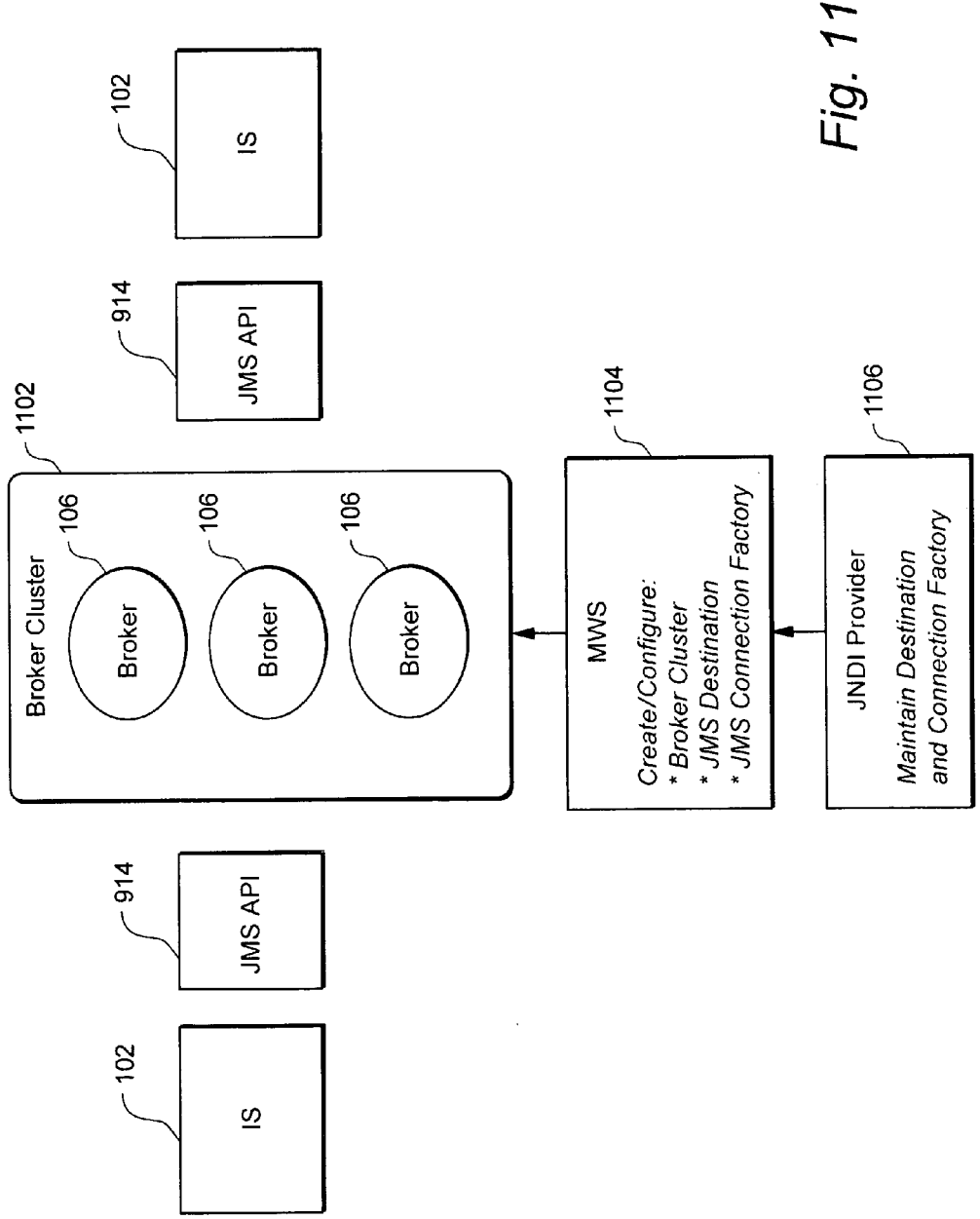
FIG. 11 is a block diagram including various elements involved in the creation of a broker cluster according to certain example embodiments.

FIG. 11 is a block diagram including various elements involved in the creation of a broker cluster according to certain example embodiments. To use the load balancing feature of certain example embodiments, a broker cluster 1102 containing multiple brokers 106 may be created. As shown in FIG. 11, the broker cluster 1102 is interposed between the publishing/requesting client (e.g., the left side) and the subscribing/replying client (e.g., the right side). Both clients include integration servers 102 (or instances thereof), as well as interfaces to the JMS API 914. A connection factory may be created, with the connection factory containing a subset of clustered brokers 106 along with associated cluster policies. A user interface tool 1104 (such as, for example, a myWeb-Methods Server or MWS commercially available from web-Methods/Software AG) enables users to first select a cluster and then a list of one or more brokers. MWS 1104 may enable users to specify which load balancing policy should be used with for a particular load balancing cluster. In other words, users may define a broker cluster as including multiple brokers and then map a specific load balancing policy to the created cluster. The user interface may be graphical or command-line driven.

As shown in FIG. 11, a JNDI provider 1106 coupled to the MWS 1104 may maintain destination and connection factory data. The JMS API 914 may selectively enable or disable load balancing based on the existence of a broker cluster definition and a load balancing policy when a JMS connection is made. If the connection factory is defined with only one broker, for example, all message publishing and receiving may be ordinary JMS messaging. If, however, the connection factory is associated with a broker cluster (e.g., multiple brokers) and a load balancing policy is specified, for example, the brokers may work as a whole and distribute the messages according to the load balancing policy.

During a publish operation, a broker cluster flag may be checked. If the flag is set, then the document may not be published to the cluster remote broker. Instead, the document may be published to the cluster gateway remote broker.

There are many different algorithms that may be used to define a load distribution policy in accordance with certain example embodiments. Several example policies are described below. It will be appreciated that these example policies range from simple round robin algorithms to more sophisticated algorithms and that the example embodiments described herein are not limited to any particular policy.

In a round robin load balancing policy, the first publish operation is processed by the first broker in the cluster connection, the second publish operation is processed by the second broker, and so on, until all brokers have been exercised. The sequence repeats then repeats. One example benefit of the round robin algorithm is that the publish operations are equally divided among the available brokers in a cluster in an orderly fashion In a "sticky" load balancing policy, a client will publish to the first broker until broker failure forces the client to switch to next broker.

In a random allocation, the publish operations are assigned to any server picked randomly among the group of brokers in a cluster. In such a case, one of the brokers may be assigned many more messages to process, while the other servers are sitting idle. However, one generally expects each broker to get a similar share of the load over time.

The "document size" policy routes messages based on the message size. An object's size may be measured, for example, by serializing it into a byte stream and examining the resulting stream length. The following code may be used for measuring the size of an object, for example:

```
public static byte[ ] sizeOf(Object obj) throws java.io.IOException
{
  ByteArrayOutputStream byteObject = new ByteArrayOutputStream( );
  ObjectOutputStream objectOutputStream =
      new ObjectOutputStream(byteObject);
  objectOutputStream.writeObject(obj);
  objectOutputStream.flush( );
  objectOutputStream.close( );
  byteObject.close( );
  return byteObject.toByteArray( );
}
```

It will be appreciated that this process may impact the runtime performance, as each message is serialized to measure its size.

The weighted round-robin policy may accommodate, for example, broker servers with different processing capacities. In a weighted round-robin algorithm, each destination (in this case, broker server) is assigned a value that signifies, relative to the other broker servers in the list, how that broker server performs. This "weight" determines how many more (or fewer) messages may be sent to that particular broker server, compared to the other servers on the list. User interfaces may be provided to specify the weight of each server in the cluster. For example, customers may determine the relative weights to assign to each broker server instance if a weight-based policy is selected for load balancing.

Each broker server in the cluster may, for example, receive a percentage of messages which is relative to its weight: %=((weight of Broker server)/(sum of weights for all the servers in the cluster))*100.

Additionally or alternatively, the distribution of messages to each broker server may be a function of the weight in real time (as opposed to only an average). The following examples are provided here for clarity:

Example 1

If all brokers in the cluster have the same weight, they will each bear an equal proportion of the load. If one broker server has weight 1 and all other broker servers have weight 2, the 1-weight broker server will bear half as much as any other server.

Example 2

Assume that there are three brokers that have been individually benchmarked and configured for deployment in a weighted round-robin environment. Assume further that the first broker can handle 100 messages/sec., the second can handle 300 messages/sec., and the last broker can handle 25 messages/sec. In this case, the weight assigned may be:

| Broker | Weight |
|--------|--------|
| Broker 1 | 4 |
| Broker 2 | 12 |
| Broker 3 | 1 |

Using this categorization, for every 17 messages that are published, four messages will be sent to Broker 1, and only one message will be sent to Broker 3.

A "multi-send" policy may support two sub-options, namely, "best effort" and "guaranteed." In the best effort multi-send sub-option, the JMS API may attempt to publish a message to all or as many brokers as possible in the cluster. The publish/send operation is considered successful if even one of the brokers receives the message. The message published to the brokers in the cluster may be non-transactional in nature. In contrast, in the guaranteed multi-send sub-option, the JMS API may publish a message by N out of M brokers in the cluster using XA transactions (see below). In this case, each Broker in the cluster may act as an individual XA resource, and the publish operation may be considered successful if the message is received by N out of M brokers in the cluster.

For the multi-send best effort policy, a JMS Client may use the standard JMS publish/send semantics to send a message to all the brokers in the cluster. Message producers may either send or publish messages to a destination.

Once the invocation of the send or publish method returns successfully, it may be assumed that the Broker has received the message. On the producer side, the notion of acknowledgement relates to a successful invocation of either the topic publisher's publish method, or the queue sender's send method. For a JMS client the multi send operation is successful if they do not receive a JMSException.

The following is a multi send best effort code example:

```
try {
  // Assumption:
  clusterFactory.setBrokerCluster(new String[ ]{"Broker
    #1@localhost:6849",
    "Broker2@localhost:6949"});
  clusterFactory.setClusterName("T1");
  clusterFactory.setClusterPolicy(WmClusterPolicyManager.-
    MULTISEND_BESTEFFORT)
  connection = ((WmConnectionFactory)
    clusterFactory).createConnection( );
  connection.start( );
  session = publisherConnection.createSession(false,
    Session.AUTO_ACKNOWLEDGE);
  MessageProducer producer = session.createProducer(queue);
  TextMessage message = session.createTextMessage("Testing Multi
    Send");
  // This will attempt to send the message to all the brokers in
    the above cluster
  producer.send(message);
  System.out.println(" Multi Send is successful");
} catch (JMSException e){
  // this means the multi send best effort failed to publish to
    even one broker in the cluster
}
```

As seen in the above example, JMS send and publish semantics may be used to publish the message to all the brokers in the cluster. Internally, the JMS API may send the message to all brokers synchronously and throw an exception, even if the message could not be delivered to at least one broker.

For the multi-send guaranteed policy, the JMS API may provide an API getXAConnections( ) to the client (in this case the Integration Server), which may return N number of XA Connections. The Integration Server may make these a part of a transaction and may perform the publish operation. This helps ensure that that the message publishing to N brokers in the cluster is successful. If there is a failure, the policy may "rollback" and attempt the send again. Each subsequent call to the getXAConnections in the JMS API may send another combination of N Brokers from the cluster active broker list. The JMS API may maintain the list with M×N combination connections.

For example, if there are 3 brokers B1, B2, and B3, configured in a cluster and the policy is multi-send guaranteed policy with 2 out of 3 guaranteed, the JMS API may maintain B1-B2, B2-B3, B3-B1 connection list.

This XA connections combination list may be maintained in a round robin fashion in certain example embodiments. This may help to ensure that the load is balanced across the brokers in the cluster.

On an exception related to Broker B1 being unavailable, the list may be updated with B1-B3 in the list, and the rest may be made inactive.

It is noted that XA connections may or may not be supported for connection factories using the multi-send guaranteed policy.

The JMS API may send three kinds of exceptions. "Success" would imply that the client succeeded in sending the message to n servers. "Partial success" would imply that the send was successful to some servers but less than required n severs. "Failure" would imply that the send failed for all servers.

The JMS API may have a separate API for clients to query if the broker is available, e.g., using an is Available( ) method that indicates whether the required number of brokers is available to publish. It is noted that this function may be available for all policy types.

In certain example embodiments, it may be advantageous to implement duplicate message detection. For example, it will be appreciated that it would be advantageous to implement duplicate detection for when the multi-send policy is selected. As explained in detail above, in a multi-send scenario, a client sends a message to the JMS API. The JMS API then establishes connections to all of the brokers in the cluster. Based on the multi-send JMS policy, the JMS API may send messages to as many brokers as it can in the cluster. The subscriber may use the same or different connection factory to connect to the broker cluster. The JMS API may establish connections to all of the brokers in the cluster to retrieve the messages from each of the brokers. These brokers may have the same messages, by virtue of the multi-send policy being selected and implemented by the publishing client.

To avoid duplicates in a multi-send scenario, a duplicate message detection feature may be implemented to help ensure that no message is delivered twice in the broker cluster environment. This detection mechanism may be performed for JMS consumer clients, for example, in the JMS API. The duplicate message detection may leverage a JMS message ID; which may be automatically generated from the producer in the JMS API during a send or publish operation. The JMS message ID may be set to represent a Universally Unique Identifier (UUID). JMS message IDs should be enabled in the connection factory when duplicate message detection features are being implemented, although it may be disabled in other contexts. The java.util.UUID class of Java SE 5 may be used to generate Universally Unique Identifier (UUID) by simply calling the method UUID.randomUUID( ) in the class, for example.

As explained in greater detail below, on the acknowledgement of the messages, the JMS API may perform an acknowledge function on the sequence id from the broker it received the message from and a pending acknowledgement on the remaining brokers in the cluster. The pending acknowledgement may be performed on the UUID set on the JMS Message. This helps to ensure that the duplicate messages on other brokers are not sent to the subscribers.

Logging may be enabled for load balancing in certain example embodiments. Categories of logged messages may include, for example, when a message is published/republished, when a message is received, when an error occurs, when connectivity changes, etc. It is noted that there may be many causes for an unreachable broker. Thus, it will be appreciated that certain example embodiments may sometimes supply a "best guess" in the load balancing solution.

The example policies described above may be considered "simple" policies, insofar as one policy effectively controls the load balancing behavior of the broker cluster. However, as alluded to above, certain example embodiments may "layer" multiple policies, one on top of the other. Thus, "simple" policies may be layered so as to define "composition" policies. In other words, composition policies may be defined and implemented as multi-level clustering policies in certain example embodiments. To use this load balancing feature, users may define individual cluster connection factories, identifying the cluster brokers and associated governing cluster policy. These child cluster connection factory objects from the JNDI provider may then be grouped, e.g., to form a composite connection factory. The composite connection factory also may have a load balancing policy defined, which determines how the messages are distributed across broker clusters. For instance, if the connection factory is associated with multiple cluster connection factory objects and a load balancing policy is specified, the clusters may work as a whole and distribute the messages according to the load balancing policy.

The following example load balancing policies may be used in connection with a composite connection factory. Of course, it will be appreciated that other load balancing policies may be used together with or in place of the example load balancing policies listed below.

- In a round robin load balancing policy, the first publish operation is assigned to the first cluster connection in the composite cluster connection, the second publish operation is assigned to the second cluster, and so on, until all clusters have been exercised, at which point the sequence repeats. One example benefit of the round robin algorithm in this context is that the publish operations are equally divided among the available clusters in an orderly fashion.
- In a sticky load balancing policy, the JMS API may attempt to publish a message to the first cluster until that cluster is no longer available. The message then may be switched to the next cluster, only if the first cluster fails.
- In a multi send-best effort policy, the JMS API may attempt to publish a message to all or a subset of clusters defined by the composite clusters connection factories. The publish/send operation is deemed successful if the message is delivered to at least one of the clusters.

To enable the clustering of broker servers, the brokers described above may be altered. For example, a broker server may support cluster creation. In this regard, document forwarding may not be required in clustering, as a subscriber may be connected to all of the brokers in the cluster. Accordingly, brokers may be notified appropriately when they join a cluster, e.g., so that document forwarding within a cluster is disabled. Another example involves changes to document forwarding. In this regard, because a subscriber may be connected to all of the brokers in the cluster, publishing a document to any one broker may be sufficient to make sure that the subscriber receives the document. Accordingly, the forwarding of a document to another broker may not be required.

Still another design possible modification relates to the pre-acknowledgement of documents. This feature may be enabled to reduce the likelihood of (or even prevent) duplicate document delivery when the multi-send policy is implemented, as indicated above. In essence, the JMS client may retrieve and send a pre-acknowledgement to other brokers so that duplicate copies of the document can be discarded by other brokers. To support this feature in the brokers, a publisher may set a UUID. A broker then may distinguish between two types of pre-acknowledgements. A first pre-acknowledgement is that a client has received at least one copy of the document. In this case, the broker may refrain from sending another copy of the document, but may keep the document in case the client disconnects before processing and acknowledging the document. A second pre-acknowledgement is that the client has received and processed/acknowledged the document. In this case, the broker may delete the document from its queue because the document is no longer needed.

Such a pre-acknowledgement feature may, in certain example embodiments, reduce the likelihood (and sometimes even prevent) duplicate messages from being sent, e.g., in the case where a publisher is sending messages according to a multi-send protocol. However, in certain example instances, this "no duplicates" behavior may not be guaranteed; accordingly a client may also have its own mechanism to detect the duplicates.

As alluded to above, a pre-acknowledgement feature may be supported by implementing two types of pre-acknowledgements in the broker. First, tentative pre-acknowledgement will prompt the broker to keep the document, but not send it to the client. This behavior may help ensure that unnecessary duplicate documents will not be sent to the client. Second, confirmed pre-acknowledgement may indicate that the client has received and successfully processed the document and, in this case, a broker may delete the document from the queue.

In greater detail, a broker client queue may maintain two collections, namely, tentative_pre_ack and confirmed_pre_ack. These collections may store UUIDs (e.g., of a data type "string") as they are pre-acknowledged by the client. These collections may be checked by the broker during publish/subscribe, and a broker may take an appropriate action (e.g., discarding the event, skipping the event, etc.).

A document identified by UUID may be tentatively pre-acknowledged in several example ways. First, for example, a publisher may set an envelope field (e.g., "preack") to "tentative," which may be read by the broker during publishing, with the document being marked as pre-acknowledged. Second, for example, a client may make an explicit call (e.g., a JMS binary protocol) and notify the broker of the tentative pre-acknowledgement. In this regard, the broker binary protocol (e.g., ProtocolV6) may be used to support new calls to notify a broker about pre-acknowledgements.

To aid in the implementation of the pre-acknowledgement feature, the publisher may set a tentative pre-acknowledgement envelope field in the document for all but one broker. If so configured, this may mean that only one broker will send the document to the subscriber, whereas the other brokers will merely hold the duplicate document in queue. On receiving the acknowledgement from the client, a regular acknowledgement may be sent (e.g., via an "ack" according to the JMS API) to the broker from where document was fetched, and a pre-acknowledgement confirmation may be sent to all other brokers.

On the broker side, the broker may check the confirmed pre-acknowledged collection during a publish operation and skip queuing the document—if the document has already been pre-acknowledged by the client. A check may be performed while adding document to the client queue. Checks may not be added to other places before inserting events to client queue such as, for example, internal publish, forward publish, forward event update, and insert event during queue browsing.

During a subscribe operation, a broker may first check the tentative pre-acknowledgement collection and, if a document is already tentatively acknowledged, skip (but not delete) the document. If already confirmed acknowledged, then the document may be deleted. An event process class may be used to determine if an event has already been pre-acknowledged. Similarly, a class may be used to determine whether to skip the event or not.

Still another possible design modification relates to supporting broker cluster gateways between two or more clusters. This feature may, for example, support failover in the case of a single broker failure as well as to support multiple redundant paths in case of a multi-send policy being implemented.

A broker cluster gateway may allow multiple gateway connections between a cluster pair. Accordingly, a single point of failure between gateway connections may be avoided in certain example embodiments. Redundancy in the system may be added, e.g., so that multi-publish scenarios may be handled appropriately. An example broker cluster gateway will now be described:

Assume the presence of a first cluster, Cluster C1, with three Brokers. Thus, C1={A, B, C}. Further assume the presence of a second cluster, Cluster C2, with two brokers. Thus, C2={X,Y}.

Given these assumptions, the set of possible gateway connections between C1 and C2 would be a sub-set of {G}={(A,X), (A,Y), (B,X), (B,Y), (C,X), (C,Y)}.

The set of possible gateway connections {G'}, which is a subset of {G}, contains distinct elements and the cardinality |G'|<=|mxn|, where m=|C1| and n=|C2|.

It is noted that multiple gateway creation between a cluster pair thus may be allowed. It is also noted that gateway deletion may need to send the detailed information to precisely identify the link to be removed. In any event, the broker publish path may find the first active gateway connection and forward the event to the corresponding RemoteBroker Queue. When the forwarded events are received at the other end, they may be processed. Any updates to the metadata sent over the multi-broker protocol may be processed, although the metadata and runtime documents may not be forwarded back to its originating cluster, e.g., to avoid creating loops in the acyclic graph.

The load balancing feature of certain example embodiments may be designed as an application solution independent of the broker protocol and storage implementation. For example, the load balancing feature of certain example embodiments may be built on top of broker API so that it is sustainable over drastic broker server code changes and/or extensible for future feature enhancements.

Example runtime components that may enable the load balancing features of certain example embodiments include a cluster connection, a broker selector, and a policy manager. The cluster connection may be implemented as a logical connection from a publisher or subscriber to a cluster of brokers. It may be implemented with a set of broker connections, e.g., as an abstract connection from a client to a broker cluster. A broker selector may be implemented as a component that detects running brokers and selects a broker (or multiple brokers) for a publisher or subscriber to connect to. A policy manager may manage policy creation, persistency, and interpretation at runtime. Each of these load balancing components may be implemented as Java classes, for example, and may be invoked when a publisher or subscriber makes a connection to the broker cluster. These classes may reside in the same Java process as the publisher or subscriber in certain example embodiments.

Each publisher or subscriber connection may correspond to only one cluster connection in certain example embodiments. A cluster connection may start multiple threads to perform active broker detection, broker selection based on the policies, connection management with individual brokers in the cluster, etc. A cluster connection may be created when a JMS application creates a JMS connection with a connection factory that contains a broker cluster definition. These connection factories are referred to herein as cluster connection factories. A cluster connection may be implemented as a subclass of a JMS connection. JMS publishers and subscribers may be created with this connection, similar to the way in which publishers and subscribers may be created with the JMS API. However, the publish methods of cluster publishers and receive methods of cluster subscribers may be overridden to incorporate the load balancing logic. When the application closes or destroys the connection, the corresponding cluster connection and broker connections managed by the cluster connection also may be closed or destroyed.

The methods that create subscriber subscriptions also may be re-implemented in the subclass for cluster connection sessions. These new methods may establish the subscriptions to all brokers in the cluster for the subscriber, e.g., transparent to the user's experience.

The broker selector may be called by the cluster connection, e.g., to select and connect to the next available broker. This may occur, for example, before an initial connection is made, before a message is published, when a connection failed, before a reconnection is made, etc. The broker selector may have a thread that periodically updates the broker status table of the cluster. This status table may be shared with cluster connection. This polling period of broker selector may be configurable, e.g., in connection with the policy selection.

The broker selector may invoke the policy manager, e.g., to retrieve policy information and runtime broker selection criteria. The format and implementation of policies may be encapsulated in the policy manager, for example. The policy manager, in turn, is a program (e.g., a Java program), that provides interfaces to a policy store and runtime handlers to policy algorithms. It may load policies from a metadata store into Java objects. It also may serialize and de-serialize the policies, e.g., based on the metadata store interfaces. It may offer a plug-in interface for customized policies, and call the runtime interface of policy implementations to discover selection criteria based on the brokers in the cluster.

Figure 12:
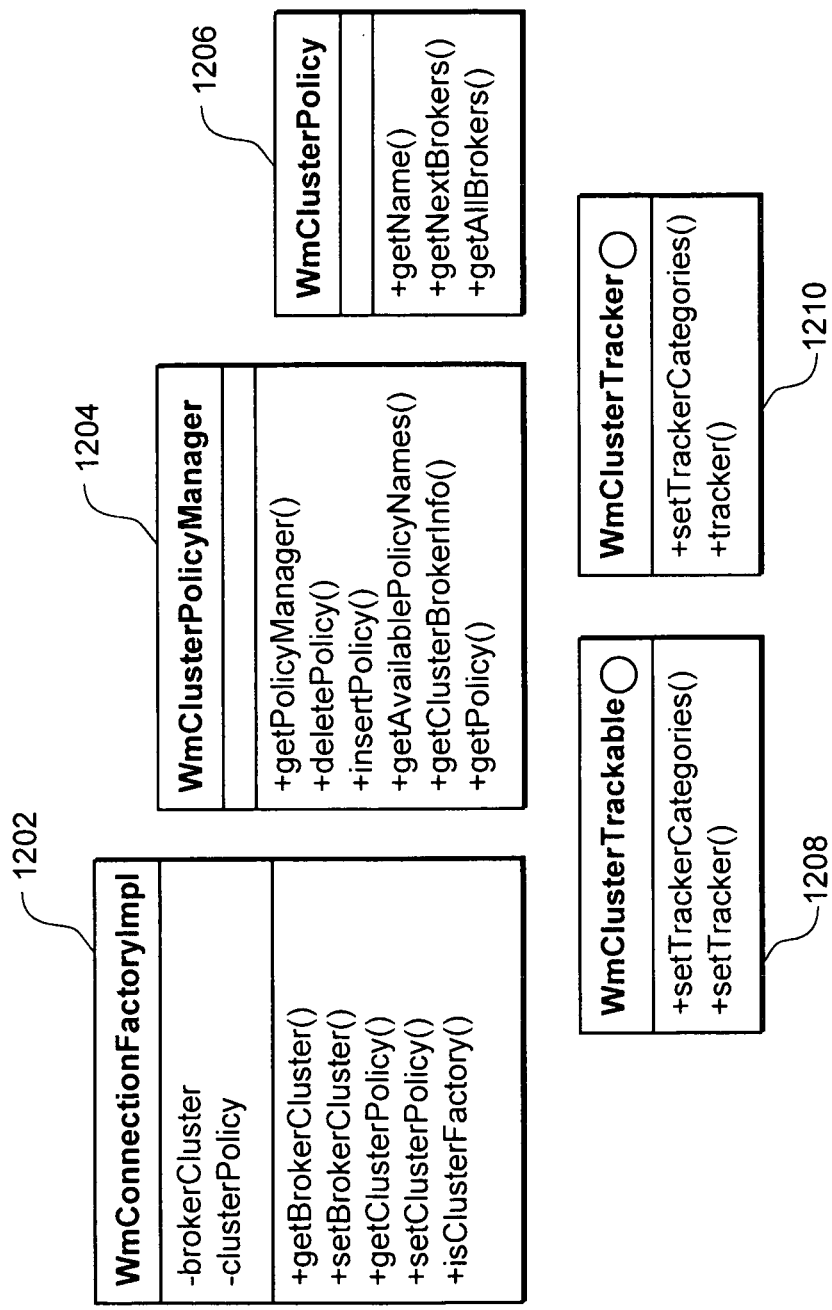
FIG. 12 illustrates certain example public application interfaces exposed by the load balancing techniques of certain example embodiments.

The load balancing techniques of certain example embodiments may provide a smooth transition for existing JMS applications to load balancing JMS applications without code change, while also reducing the number of configuration changes to connection factories. Certain example public application interfaces exposed by the load balancing techniques of certain example embodiments include the policy manager interfaces and a logger plug-in interface, as shown in FIG. 12. In other words, FIG. 12 shows example public interfaces exposed by the load balancing techniques of certain example embodiments. As shown in the FIG. 12 example, these classes may include WmConnectionFactoryImpl 1202, WmClusterPolicyManager 1204, WmClusterPolicy 1206, WmClusterTrackable 1208, and WmClusterTracker 1210. These classes are described below, in turn.

Two properties are be added to the existing WmConnectionFactoryImpl.

brokerCluster: a Java String array that contains all the Brokers specified with the connection factory. Order of the Brokers is preserved as the user defined order.

clusterPolicy: the name of the load balance policy defined with the connection factory.

It will be appreciated that that additional properties may be included to support other policies such as, for example, setMultiSendCount for the Multi Send guaranteed policy and weights for each broker in the weighted round robin policy.

As above, additional public methods may be provided to support the other properties.

WmConnectionFactoryImpl has the following setting and getting functions:

setBrokerCluster: Assigns a list of brokers as the cluster for the connection factory.

getBrokerCluster: Gets the list of the cluster brokers defined with the connection factory.

setClusterPolicy: Retrieves the name of the load balancing policy.

getClusterPolicy: Specifies the load balancing policy to be used with the connection factory connections.

isClusterFactory: Returns true if this connection factory is associated with a broker cluster; otherwise, returns false.

WmClusterPolicyManager handles policy management for the load balancing components. It also may be called from other programs to access the policy metadata store. The WmClusterPolicyManager may be invoked, e.g., to discover existing policies and to create customized policies of users. In this regard, the WmClusterPolicyManager Interface has the following methods:

getPolicyManager: Finds the policy manager used for this application.

getClusterBrokerInfo: Returns a set of cluster brokers for clients to connect to, based on the current policy. If no brokers are specified, it returns an empty set, and the cluster connection exception handler will treat it as a connection error.

getAvailabelPolicyNames: Retrieves available policy names for this application.

insertPolicy: Creates and inserts a customized policy.

deletePolicy: Removes a policy from the available policy list.

getPolicy: Finds the run policy instance based on the policy name.

WmClusterPolicy defines one method, getNextBrokers( ), which returns a preferred set of brokers to connect to, based on a given broker cluster.

WmClusterTrackable provides methods to plug in a tracking tool for diagnostic usage:

setTracker: This method is called from a load balancing application to configure a tracker tool or database to be used by the load balancing. The tracker should implement a WmClusterTracker interface. If no tracker is set, the load balancing will not write out any data.

setTrackerCategories: Defines the types of action data to record.

WmClusterTracker provides methods to log messages:

Track: Writes a record if an action is required to be tracked.

setTrackerCategories: Lets applications to configure the types of actions to track.

Figure 13A:
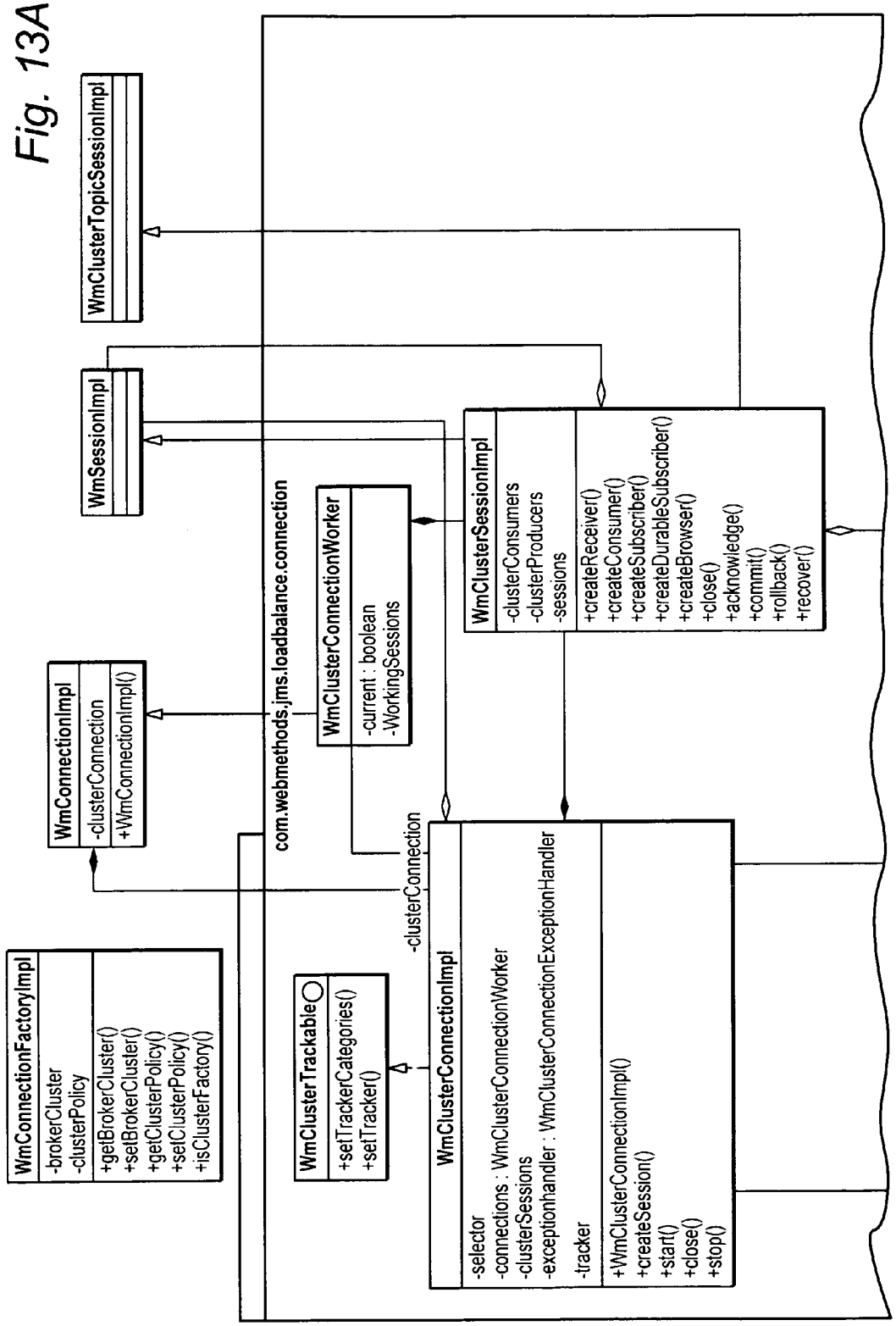
FIGS. 13-15 illustrate example cluster connection, policy manager, and broker selector class diagrams in accordance with example embodiments.
Figure 13B:
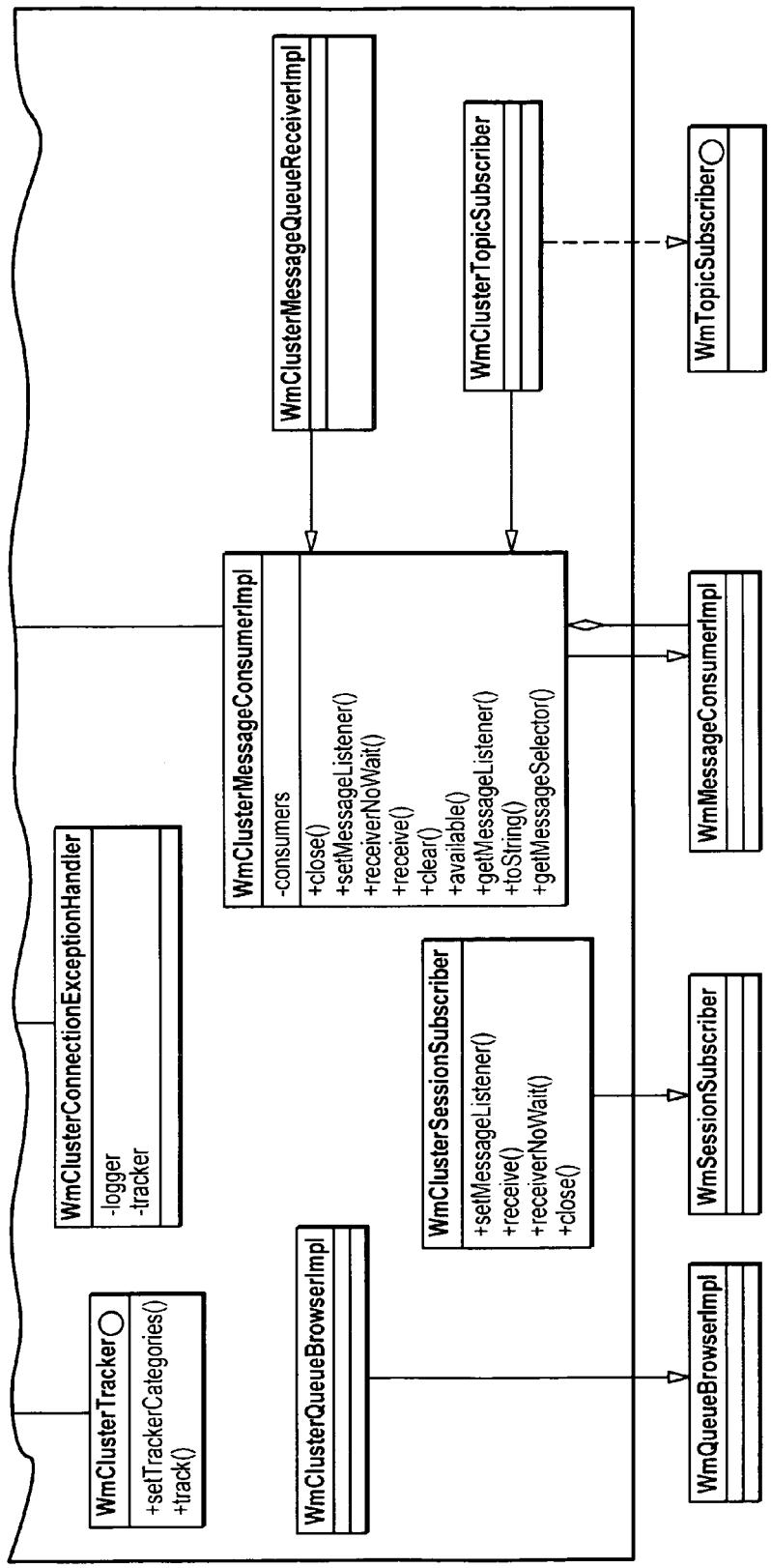
Figure 14:
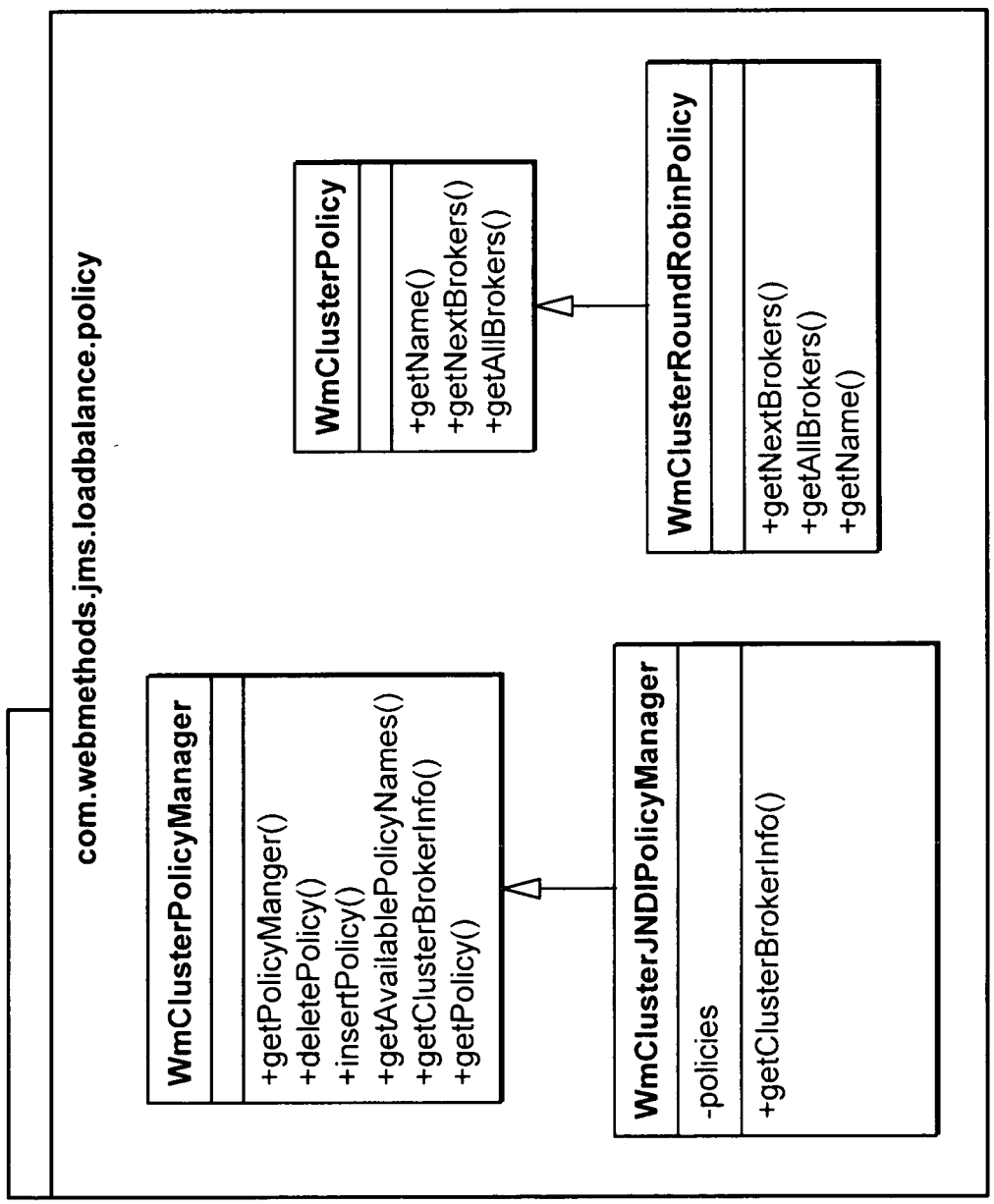

Example cluster connection, policy manager, and broker selector class diagrams will now be described in connection with FIGS. 13-15. The cluster connection component comprises the following classes, as shown visually in FIG. 13:

WmClusterConnectionImpl: This class is constructed when a JMS connection is created on a cluster connection factory and serves as the initiator of the load balancing functions. It implements the WmClusterTrackable interface, and is a composite part of WmConnectionImpl that handles cluster connection functions.

Several subclasses of WmConnectionImpl are extended to offer clustering behaviors. These subclasses include, for example: WmClusterQueueConnectionImpl, WmClusterTopicConnectionImpl, WmClusterXAConnectionImpl, WmClusterXAQueueConnectionImpl, and WmClusterXATopicConnectionImpl.

WmClusterConnetionWorker: a subclass of WmConnectionImpl. It is the worker class in load balancing that manages a client connection to a Broker. WmClusterConnectionImpl may own multiple WmClusterConnectionWorker instances.

WmClusterConnectionExceptionHandler: listens and handles connection related failure and updates broker cluster status table.

WmClusterSessionImpl classes: a subclass of WmSessionImpl that overwrites the session methods for creating broker clients for load balancing. It also provides publish methods for load balancing publishing.

Clustering extensions of various session implementations include: WmClusterQueueSessionImpl, WmClusterTopicSessionImpl, WmClusterXASessionImpl, WmClusterXAQueueSessionImpl, and WmClusterXATopicSessionImpl.

WmClusterMessageConsumerImpl: a subclass of WmMessageConsumerImpl that implements receive methods for load balancing subscribers.

WmMessageProducerImpl subclasses: a set of subclasses of WmMessageProducerImpl that implements clustering behaviors. These include WmClusterQueueSenderImpl and WmClusterTopicPublisherImpl.

WmClusterQueueBrowserImpl: a subclass of WmQueueBrowserImpl that implements the logic of aggregating all physical queues into one cluster queue. A new message browser class may be implemented.

The cluster connection component also defines two interfaces:

WmClusterTrackable: an interface that allows plug-in trackers. WmClusterConnectionImpl implements this interface.

WmClusterTracker: an interface that a plug-in tracking tool or database application implements.

The policy manager deals with policy persistency and discovery, e.g., by providing handlers to policies that the broker selector may consult for broker selection criteria. It includes the following classes as shown visually in FIG. 14:

WmClusterPolicyManager: an abstract class that works as the policy factory. It loads and saves policies to an associated metadata store.

WmClusterPolicy: an abstract class that provides the plug-in interface of a policy. It implements generic behaviors of load balancing algorithms.

Concrete Policy Manager classes: subclasses of WmClusterPolicyManager, such as the WmClusterJNDIPolicyManager, which implement the details of accessing a specific metadata store.

Concrete Policy classes: subclasses of WmClusterPolicy, such as WmClusterRoundRobinPolicy, which implement specific algorithms or rules for selecting runtime Brokers to connect.

Figure 15:
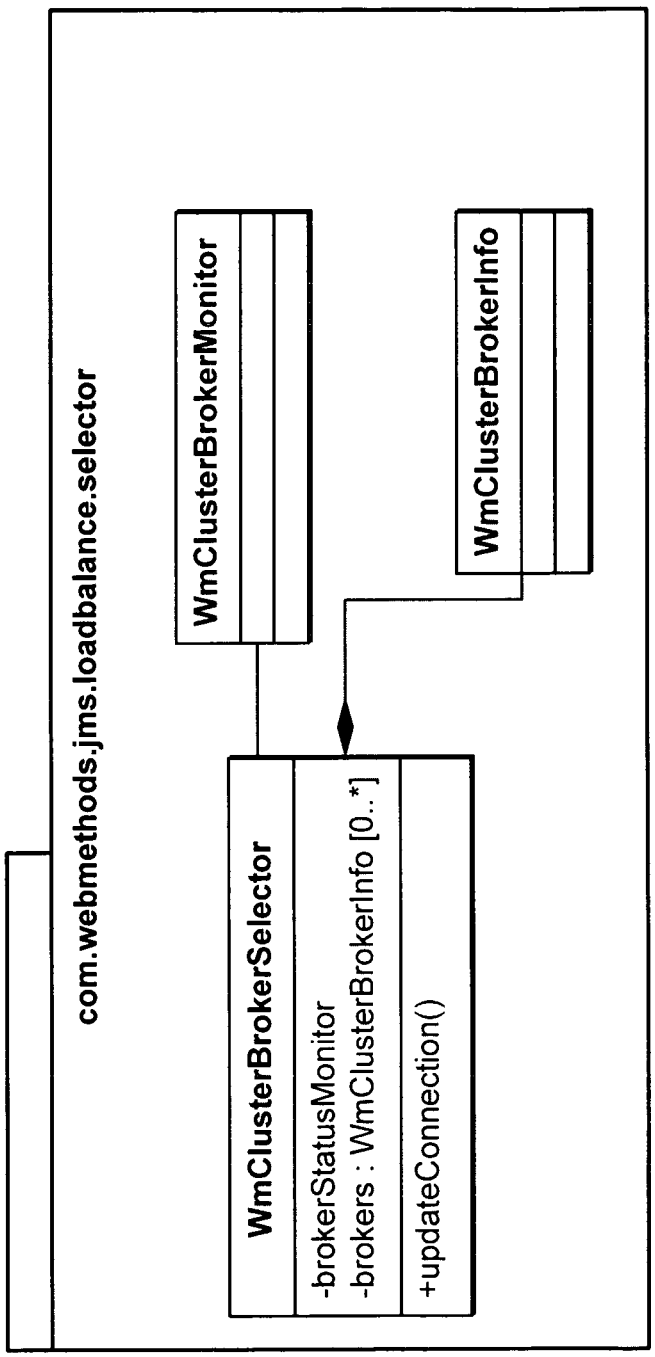

The broker selector classes shown in FIG. 15 are responsible for finding the next set of brokers to connect to. The broker selector includes these main classes:

WmClusterBrokerSelector: consults the policy manager and analyzes the cluster broker status information to provide selective brokers for cluster connection.

WmClusterBrokerMonitor: periodically polls the clustered brokers for runtime information. The poll interval may be customized by users, e.g., as a connection factory property.

WmClusterBrokerInfo: maintains runtime information about the brokers in the cluster, which may or may not be persisted.

Figure 16:
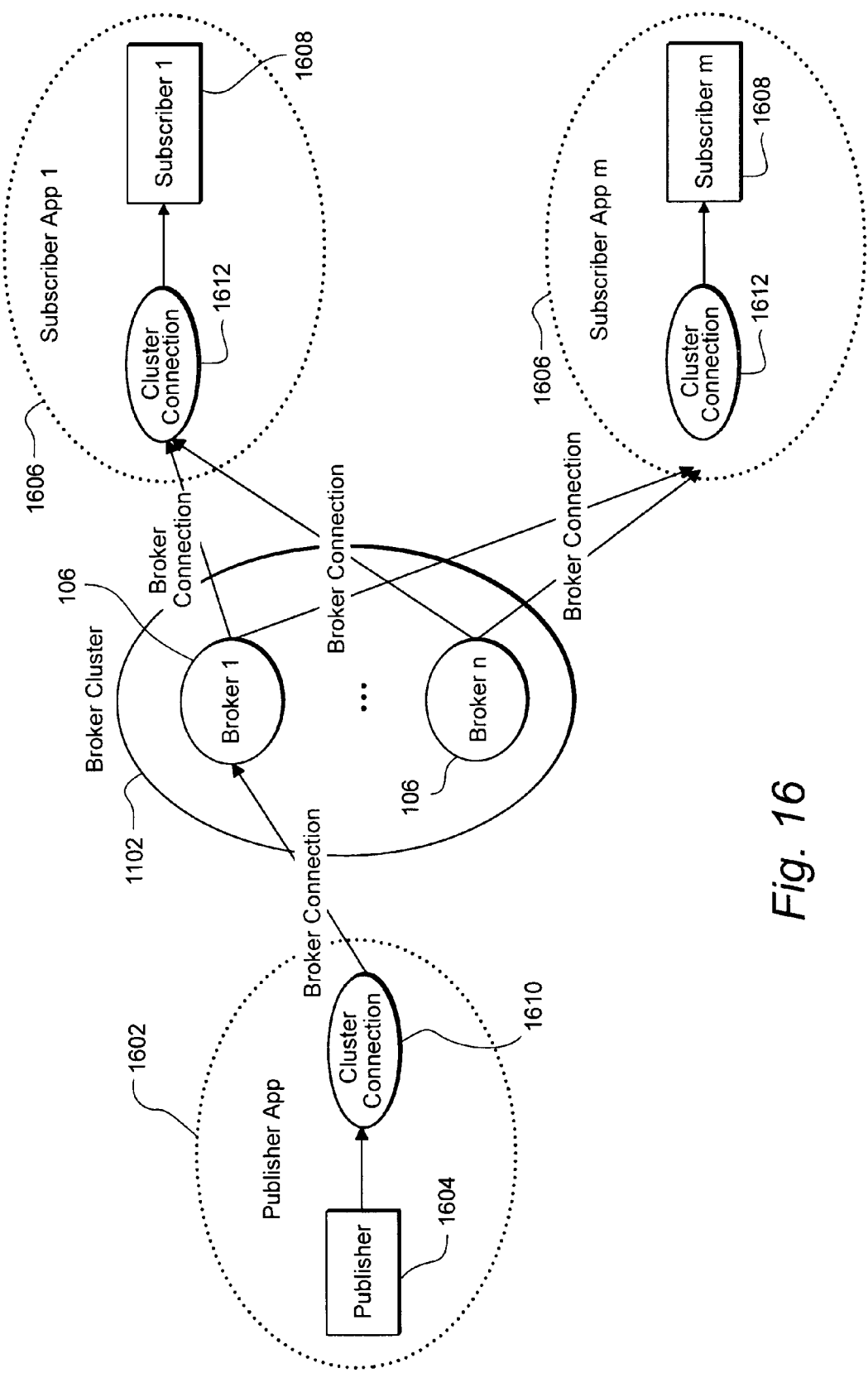
FIG. 16 shows the overall structure of a load balancing broker JMS application in accordance with an example embodiment.

FIG. 16 shows the overall structure of a load balancing broker JMS application in accordance with an example embodiment. As shown in FIG. 16 and as indicated above, a load balancing broker JMS application has three types of actors, including a publisher application 1602, a broker cluster 1102, and a subscriber application 1606. JMS load balancing publishers and subscribers 1604 and 1608 work the same way as ordinary JMS publishers and subscribers, e.g., in the way that they associate with connections 1610 and 1612, respectively, and perform message publishing/subscribing. Thus, much of the "pub/sub" behavior described above also applies with respect to load balancing example embodiments. The load balancing features of certain example embodiments may be enabled automatically, e.g., whenever a JMS application initiates a JMS connection with a broker cluster connection factory. The load balancing classes may run in the same virtual machine (e.g., Java Virtual Machine or JVM) as the applications, but the mechanics of the load balancing components may be transparent to applications.

As illustrated in FIG. 16, load balancing publishers 1604 and subscribers 1608 connect to a set of brokers 106 in the form of a broker cluster 1102. The brokers 106 in the broker cluster 1102 work as a whole to share work load and provide load balance. The implementation of the load balancing functions may be provided within the JMS API, invoked from the publisher applications 1602 or subscriber applications 1606.

Cluster connection 1610 and 1612 may work on both sides of the cluster 1102. A publisher application 1602 is associated with cluster connections 1610, with each of the cluster connections 1610 connecting to one or multiple brokers 106 in the cluster 1102, depending on the policy implemented. Similarly, a subscriber application 1606 also is associated with cluster connections 1610, which connect to all brokers 106 in the cluster 1102. These direct connections to the brokers 106 may be maintained by the cluster connection component.

The runtime behavior of certain example embodiments will now be described. In particular, the load balancing function may be enabled through JMS connection code at runtime, which alters connection and pub/sub flows.

From a publisher application, the application code calls for connection creation. This initiates creation of a cluster connection and its associated classes, e.g., to manage a connection to a cluster of brokers. In making a connection, the cluster connection first consults the broker selector to discover the first set of brokers to connect to. When the application creates a session, a cluster session is populated. Publishing to a cluster session invokes the cluster connection to update the current connection. In the case of a round robin policy, for example, the cluster connection connects to the next broker before a message is published.

If a broker is not available, the broker status table is updated, and the load balancing will skip that broker for connection.

When the user application closes a JMS connection, the related cluster connection is closed and the associated load balancing classes are destructed.

Figure 17:
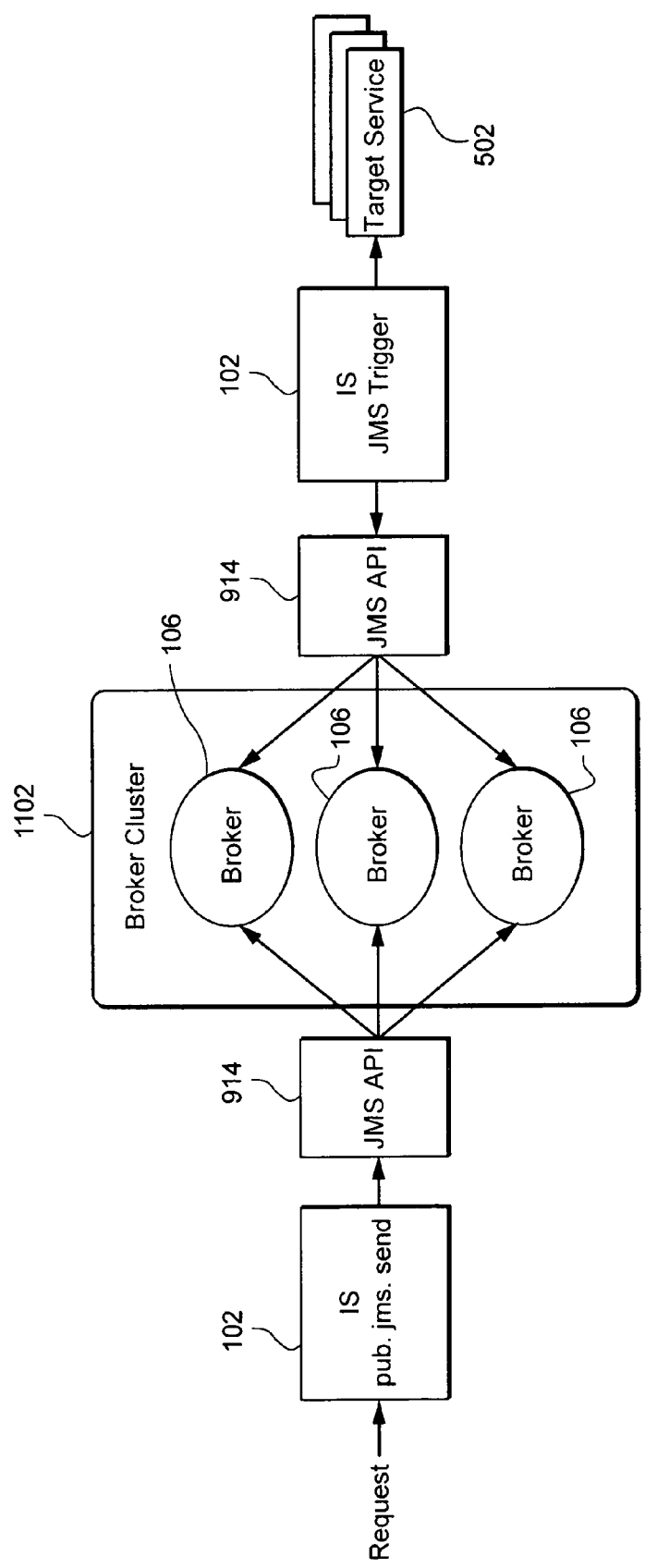
FIG. 17 is a block diagram illustrating various elements involved in the implementation of a load balancing publish/subscribe model according to certain example embodiments.

FIG. 17 is similar to FIGS. 11 and 16 in that FIG. 17 is a block diagram illustrating various elements involved in the implementation of a load balancing publish/subscribe model according to certain example embodiments. In particular, FIG. 17 shows a request being made via the integration server 102, e.g., via the pub.jms.send method which, in turn, invokes the JMS API 914. Connections are established via the JMS API 914 to each of the brokers 106 in the configured broker cluster 1102 on the requesting/publishing client side (e.g., the left side of FIG. 17). On the reply/subscribing side (e.g., the right side of FIG. 17), the integration server 102 includes triggers (e.g., JMS triggers) configured to invoke one or more target services 502. The integration server 102 on the reply/subscribing side, like the integration server 102 on the requesting/publishing client side, is connected to each of the brokers 106 in the configured broker cluster 1102. The details of how an example round-robin policy may be implemented in connection with the schematic views shown in FIGS. 16 and 17 are explained in connection with FIGS. 18 and 19.

Figure 18:
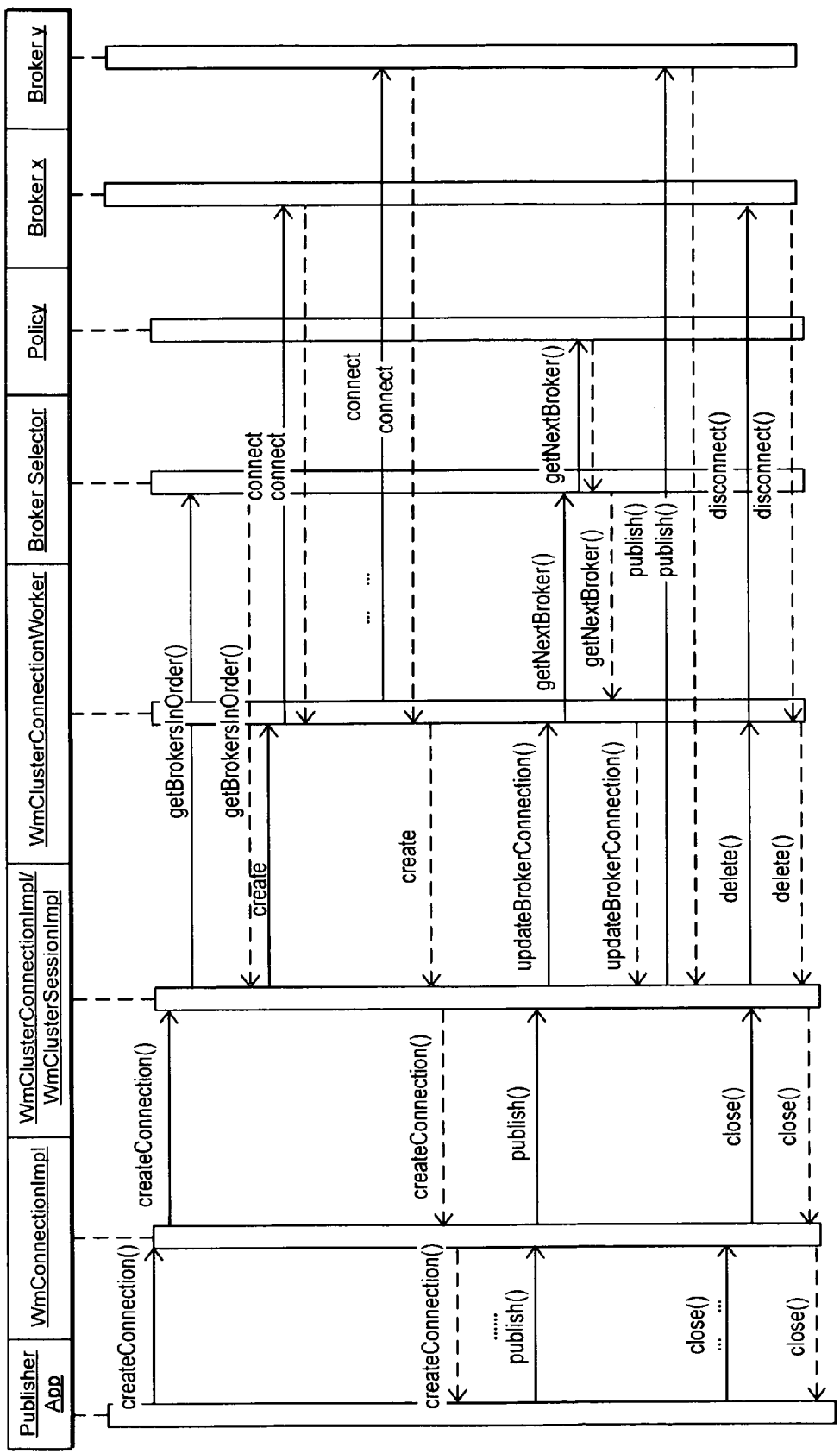
FIG. 18 is an example sequence for load balancing publishing according to a round robin policy in accordance with an example embodiment.
Figure 19:
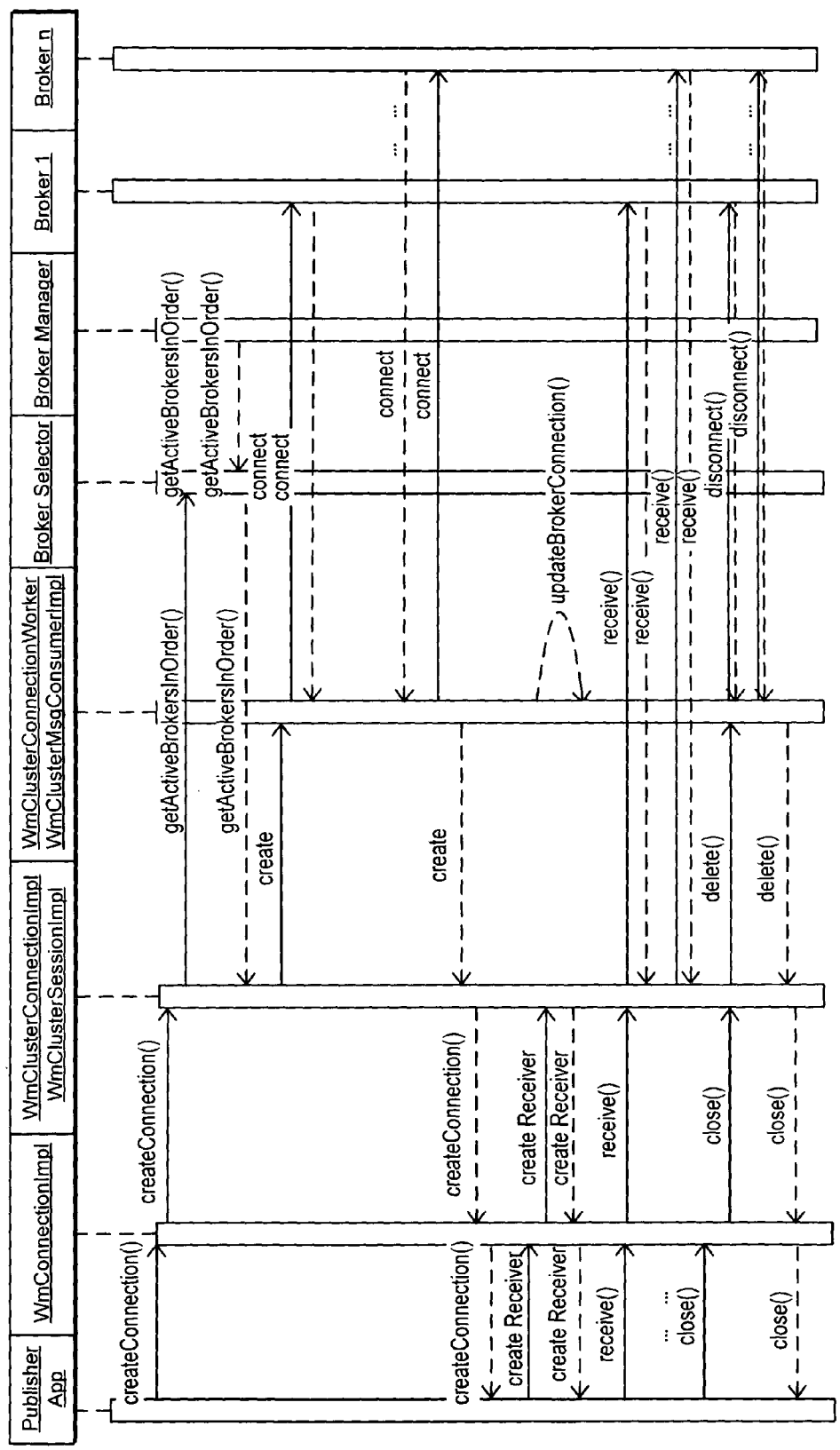
FIG. 19 shows a cluster connection being created when a subscriber application creates a JMS connection in accordance with an example embodiment.

FIG. 18 illustrates an example sequence for load balancing publishing according to a round robin policy in accordance with an example embodiment. Similarly, a cluster connection is created when a subscriber application creates a JMS connection, as shown in FIG. 19. A cluster session also is created instead of a regular JMS session. When the subscriber application constructs a subscriber, the cluster connection generates helper class instances, e.g., to handle connections to all brokers in the cluster. In the load balancing application, cluster consumer subclass instances are populated.

The same subscription is populated to all brokers, and local-only subscription may be forced in territory brokers. When the consumer receives messages, all cluster consumers are called to receive messages from all brokers. There may or may not be a predefined order of the messages received from the brokers.

The cluster connection, cluster session, and cluster consumers are destroyed when the subscriber application closes the connection or terminates.

Certain example embodiments may provide transactional messaging support in a clustered environment. For example, certain example embodiments may provide JTA/XA support in a JMS clustered environment. In this regard, the JMS implementation may act as a resource manager in a distributed transaction in a manner similar to the way a database handles a distributed transaction. In a typical scenario, an application server acts as a transaction manager for two phase commit (2PC) transactions between two or more JMS Sessions and/or database resource. The following table provides an overview of example design changes that enable the implementation of XA global transactions in the JMS clustered environment of certain example embodiments:

| Class | Method | Description |
| --- | --- | --- |
| WmXAConnectionFactoryImpl | javax.jms.XAConnection createXAConnection( ) throws javax.jms.JMSException | The JMS Provider implements JTS support by using WmXAConnectionFactoryImpl, which can be used to create a clustered XA Connection and XA Sessions |
| WmClusterXAConnectionImpl | public XASession createXASession( ) throws JMSException | This will return an instance of WmClusterXASessionImpl. WmClusterXASessionImpl encapsulates the child sessions associated with each of the broker connections in the cluster |
| com.webmethods.jms.loadbalance.connection.WmClusterXASessionImpl | public XAResource getXAResource( ) | Returns an XA resource to the caller. The XAResource returned represents the cluster as a whole using WmClusterXASessionImpl and not the individual broker sessions within the cluster. The transaction manager obtains an XAResource for each connection participating in a global transaction. The transactional assignment of a XASession can be controlled by obtaining its XAResource. The transaction manager uses the XAResource to assign the session to a transaction; prepare and commit work on the transaction; etc |
| | public void start(Xid xid, int flags) throws XAException public void end(Xid xid, int flags) throws XAException | For an XAResource to participate in a distributed transaction, the XAResource instance must be enlisted with the Transaction object using start method and is delisted using end method. This method starts work on behalf of a transaction branch specified in xid If TMJOIN is specified, the start is for joining a transaction previously seen by the resource manager. The transaction manager uses the start method to associate the global transaction with the resource, and it uses the end method to disassociate the transaction from the resource. The resource manager is responsible for associating the global transaction to all work performed on its data between the start and end method invocation. For a clustered environment, the start method in the WmClusterXASessionImpl will delegate it to the child XAsession/XAresource of an individual broker in the cluster. All messages belonging to this global transaction are routed to a single broker in the cluster, which is determined by the cluster policy(Round-Robin, Sticky). The next global transaction messages on the XAresource will be delivered to next broker. Since each transaction branch receives exactly one set of prepare-commit calls during Two-Phase Commit (2PC) processing, this design is appropriate. The WmClusterXASessionImpl will maintain a HashMap of xid and the child broker session handling the particular transaction. This is populated during the call to start( ) and used in subsequent XA methods like end, prepare, commit to know the broker session and thus broker connection on which the current transaction command is to be issued. |
| WmClusterXASessionImpl | public int prepare(Xid xid) throws XAException | Ask the resource manager to prepare for a transaction commit of the transaction specified in xid. This method will internally determine the right broker session within the cluster that handles this particular transaction and issues a prepare on the corresponding connection thereafter. |
| | public void rollback(Xid xid) throws XAException | Inform the resource manager to roll back work performed on behalf of a transaction branch. This method will internally determine the right broker session within the cluster that handles this particular transaction and issues a rollback on the corresponding connection thereafter. |
| | public void commit(Xid xid, boolean onePhase) throws XAException | Commit the global transaction specified by xid. This method will internally determine the right broker XA session within the cluster that handles this particular transaction and issues a |

-continued

| Class | Method | Description |
|---|---|---|
| | | commit on the corresponding connection thereafter. |
| | public Xid[ ] recover(int flag) throws XAException | Obtain a list of prepared transaction branches from a resource manager. This method will internally determine the right broker session within the cluster handling this particular transaction and issues a recover on the corresponding connection thereafter |
| | public void forget(Xid xid) throws XAException | Tell the resource manager to forget about a heuristically completed transaction branch. This method will internally determine the right broker session within the cluster handling this particular transaction and issues a forget on the corresponding connection thereafter. |
| | boolean isSameRM(XAResource xares) | This method is called to determine if the resource manager instance represented by the target object is the same as the resource manager instance represented by the parameter xares. Returns true if the underlying clustered connection object is the same for both the resources. |

Figure 20:
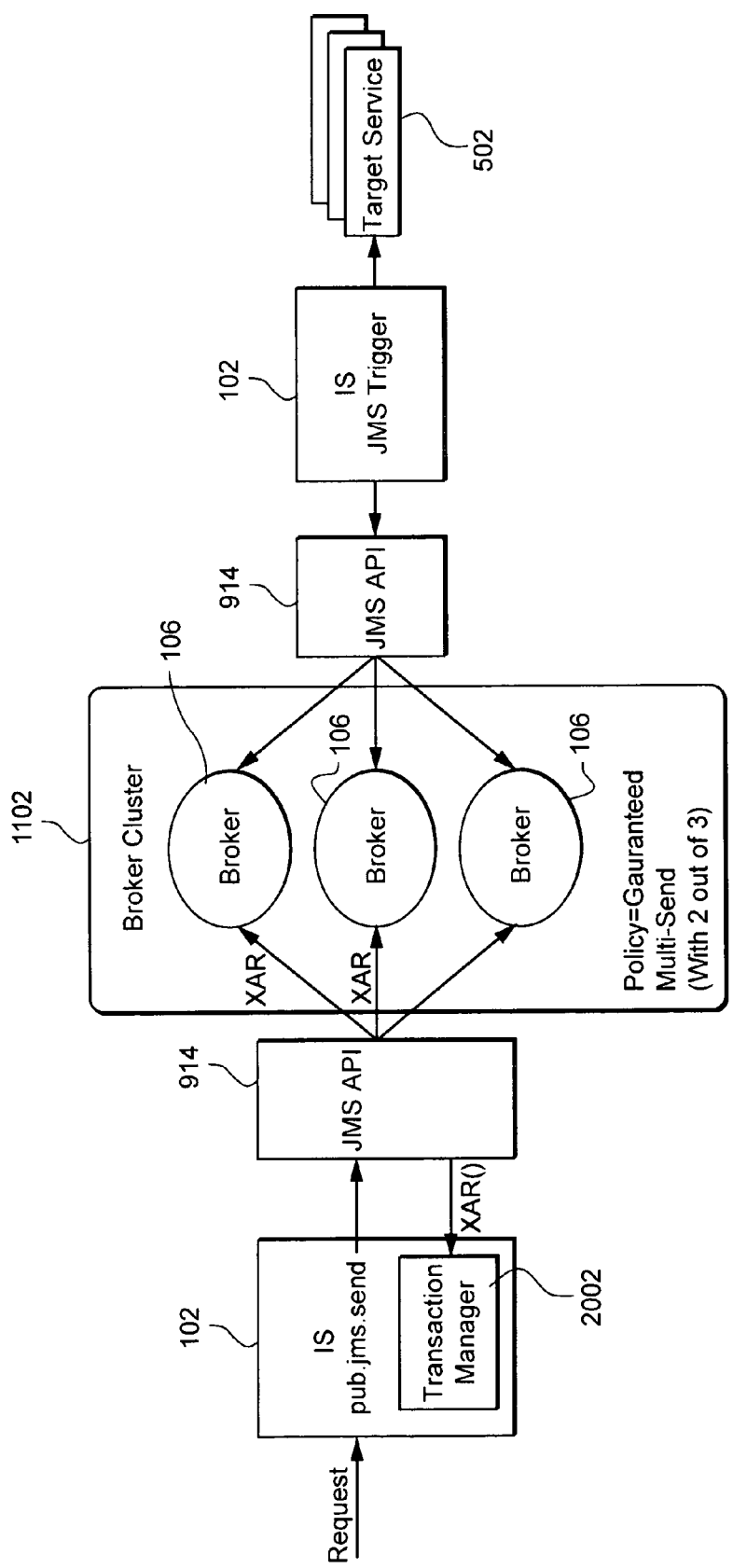
FIG. 20 is a block diagram of the components used in a guaranteed multi-send policy implemented using a broker cluster in accordance with an example embodiment.

FIG. 20 is a block diagram of the components used in a guaranteed multi-send policy implemented using a broker cluster in accordance with an example embodiment. Thus, FIG. 20 includes elements and connections similar to those shown in FIG. 17. However, FIG. 20 implements a guaranteed multi-send policy, with two out of three brokers providing guaranteed messaging. Thus, when the integration server 102 sends messages to the JMS API 914, the two of the three connections between the JMS API 914 and the brokers 106 in the broker cluster 1102 are XAR (XA resource) connections. Similarly, the publishing/requesting integration server 102 (to the left of FIG. 20) includes a transaction manager 2002. This transaction manager 2002 is configured to receive confirmation XAR calls from the JMS API 914.

Figure 21:
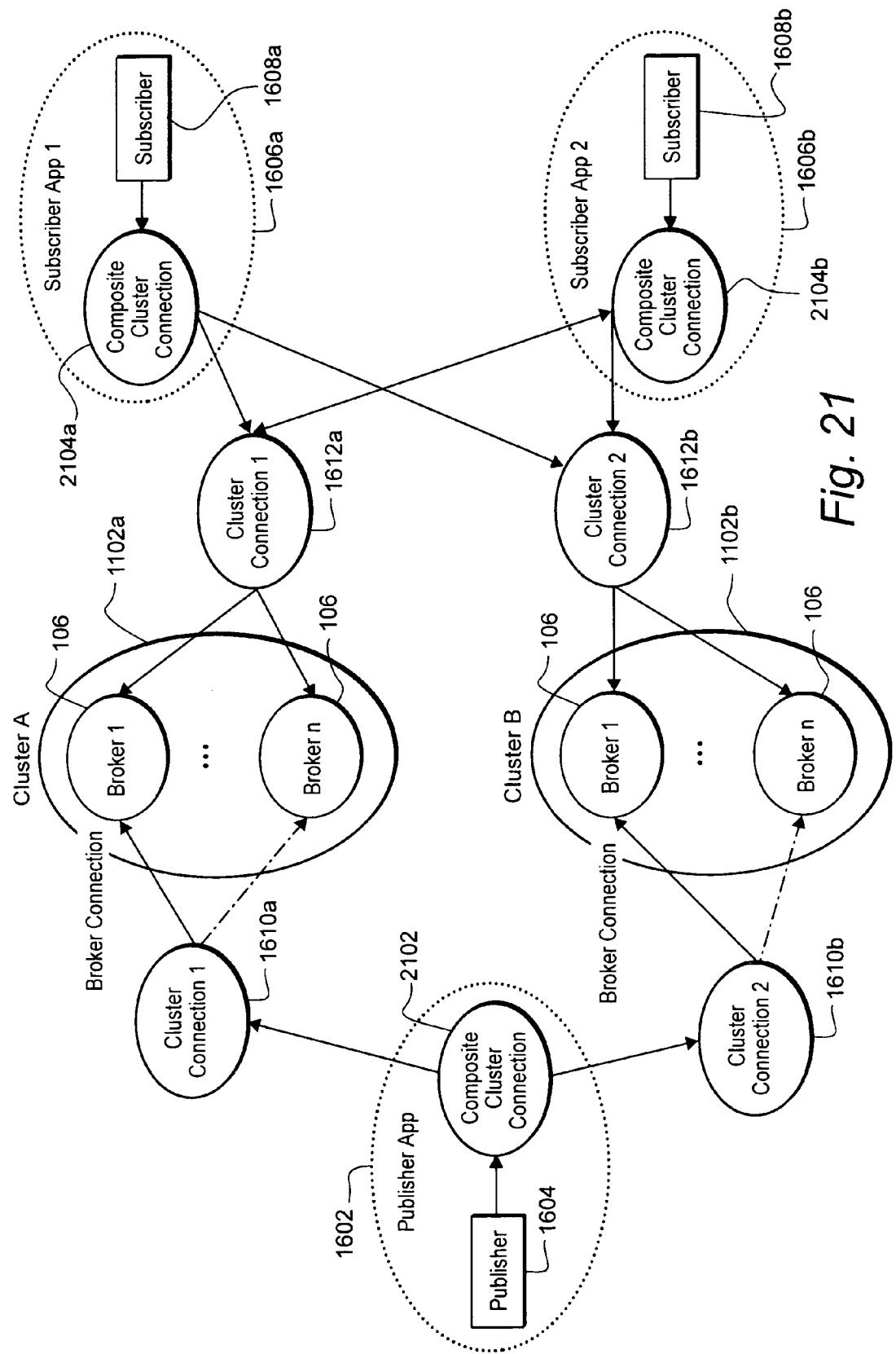
FIG. 21 shows the overall structure of a load balancing broker JMS application that implements a composite policy in accordance with an example embodiment.

FIG. 21 shows the overall structure of a load balancing broker JMS application that implements a composite policy in accordance with an example embodiment. FIG. 21 thus is similar to FIG. 16, except that FIG. 21 shows policies being "layered" one on top of the other, e.g., by providing a composite cluster connection that communicates with two or more cluster connections. More particularly, as illustrated in FIG. 21, a publisher 1604 and subscribers 1608a and 1608b connect to a set of clusters 1102a and 1102b which together define a composite cluster. These clusters 1102a and 1102b work as a whole to share the work load, thereby providing load balancing and/or duplication depending, for example, on the composite cluster policy being implemented.

JMS load balancing publishers and subscribers may work substantially the same way as ordinary JMS publishers and subscribers in the way that they associate with connections and perform message publishing/subscribing. In particular, the publisher 1604 of a publisher application 1602 may be associated with a composite cluster connection 2102 according to a first policy. The composite cluster connection 2102 may, in turn, have multiple cluster connections 1610a and 1610b associated with it. These cluster connections 1610a and 1610b may operate according to a second policy (or multiple different policies), so that that further load balancing is performed with respect to each of the clusters A and B 1102a and 1102b. The policies implemented by and/or embodied in the composite cluster connection 2102, the first cluster connection 1610a, and the second cluster connection 1610b may be the same policies or different policies according to different example embodiments of the invention.

The Connection Factory may be explicitly configured by the user. Example user-based configuration steps may include or entail, for example:

- Deciding the composite cluster policy that decides how messages will be distributed to the entire cluster. For example, a user may choose a multi-send best effort policy to duplicate the message in each of the clusters. Other example composite cluster policies for load balancing include, for example, the round robin and sticky policies.
- Associating child cluster connection factories to the composite connection factory. Each child cluster connection factory may represent a cluster, and the cluster policy governing how messages it receives may be distributed to its brokers.
- Enabling the load balancing features (e.g., automatically) whenever a JMS application initiates a JMS connection with a composite cluster connection factory.
- Enabling composite cluster connections on both sides of the cluster. A publisher application may be associated with a composite cluster connection which, in turn, delegates the task to child cluster connections based on the policy. The cluster connection that maintains all of the broker connections in the cluster may further distribute the message to the proper broker(s) based on its policy. The policy may be, for example, round robin, sticky, multi-send best effort, document size, weighted, etc.

In certain example embodiments, enabling a composite cluster policy does not impact the JMS API interface. Illustrative details regarding an example implementation are provided below.

The WmConnectionFactoryImpl may have the following properties that are applicable for a composite cluster:

CopyOnWriteArrayList
<WmConnectionFactory>_compositeClusterConn Factories—Composite Broker cluster definition as an ordered list of child cluster ConnectionFactories. Instances of WmConnectionFactoryImpl with the policy and broker cluster definition may be saved to this property when users create a composite connection factory.

private String_clusterPolicyName—The name of the load balance policy defined with in the composite cluster connection factory. Possible values include, for example, ROUND_ROBIN, STICKY, RANDOM or MULTISEND—BESTEFFORT.
private boolean_is CompositeFactory—Identifies whether the connection factory is a composite factor.

WmConnectionFactoryImpl may include the following new setting and getting functions:

| | |
|---|---|
| getCompositeChildConnFactories (CopyOnWriteArrayList<WmConnectionFactory>) | Assigns a list of child cluster connection factories to a composite connection factory |
| public CopyOnWriteArrayList<WmConnectionFactory> getCompositeChildConnFactories( ) | Returns the list of child cluster connection factories assigned to the composite connection factory. |
| Boolean isCompositeClusterFactory( ) | Returns true if this connection factory is associated with a composite cluster definition; otherwise, returns false. |

The Composite Cluster Connection component may comprise the following classes in a package (e.g., com.webmethodsjms.loadbalance.connection.composite). The design follows the cluster connection component which, as described above, load balances among multiple brokers. This component may be extended to composite clusters to load balance among clusters.

public class WmCompositeClusterConnectionImpl extends WmClusterConnectionImpl and implements WmClusterTrackable. WmCompositeClusterConnectionImpl is constructed when a JMS connection is created on a composite cluster connection factory and serves as the initiator of the load balancing functions. It follows the composite pattern and thus extends the child class WmClusterConnectionImpl.

All of the JMS connection functions may be delegated to a child cluster connection implementation based on the policy.

Several subclasses of WmCompositeClusterConnectionImpl may be extended to offer clustering behaviors. These subclasses may include, for example, WmCompositeClusterQueueConnectionImpl, WmCompositeClusterTopicConnectionImpl, WmClusterXAConnectionImpl, WWmCompositeClusterXAQueueConnectionImpl, and WmCompositeClusterXATopicConnectionImpl.

WmCompositeClusterConnetionWorker is a subclass of WmClusterConnectionImpl. It is the worker class in load balancing that manages a connection to the cluster. WmCompositeClusterConnectionImpl maintains a HashMap of WmCompositeClusterConnetionWorker instances mapping to each of the child cluster connection factory objects. This helps enable the start, publish tasks to be executed in parallel for each of the child cluster connections.
  WmCompositeClusterSessionImpl is a subclass of WmClusterSessionImpl and overwrites the session methods for creating Broker clients for load balancing. It also provides publish methods for load balancing publishing.

Clustering extensions of various session implementations aremay include, for example: WmCompositeClusterQueueSessionImpl, WmCompositeClusterTopicSessionImpl, WmCompositeClusterXASessionImpli, WmCompositeClusterXAQueueSessionImpl, and WmCompositeClusterXATopicSessionImpl.

WmCompositeClusterMessageConsumerImpl is a subclass of WmMessageConsumerImpl that implements receive methods for load balancing subscribers.
  WmCompositeMessageProducerImpl subclasses is a set of subclasses of WmClusterMessageProducerImpl that implements clustering behaviors. These include, for example, WmCompositeClusterQueueSenderImpl and WmCompositeClusterTopicPublisherImpl.

WmCompositeClusterQueueBrowserImpl is a subclass of WmQueueBrowserImpl that implements the logic of aggregating all physical queues into one cluster queue.

The policy manager may include the following classes and/or functions for use with composite policies in accordance with certain example embodiments:
  WmClusterPolicy—an abstract class that provides the plug-in interface of a policy. It implements generic behaviors of load balancing algorithms.
  getNextPublishCluster—finds the next cluster to publish message to as per the composite cluster policy.
  Concrete Policy classes—subclasses of WmClusterPolicy such as, for example, WmClusterRoundRobinPolicy. They implement specific algorithms or rules for selecting runtime clusters to connect.

As indicated above, certain example may account for a number of failover scenarios. A description of example failover scenarios and the way(s) in which they may be handled is provided below.

In a first example, if a broker server is down during the cluster initialization and is started later during publish, the broker is included in the active brokers list and is used for publishing at runtime.
  In a second example, if a broker server is restarted during the publish operation, it is not used for publishing until it restarts successfully and completely. During this period, the remaining brokers in the Broker cluster list are used for publishing and share the work load.
  In a third example, if a broker server goes down during a publish operation, the JMS client API keeps trying to reconnect to the broker server. The property "com.webmethods.jms.reconnectAttempts" defines the number of times the JMS client API attempts to reconnect to the broker. Within the number of attempts, if the broker server is up in running, it will be used for publishing. A configurable reconnectInterval property may define the interval between reconnect attempts in certain example embodiments.
  In a fourth example, if the broker server is not available within the reconnect attempts, it will not be available for publishing until the JMS client/application is restarted. Users may set the reconnect attempts value appropriately if they wish to use a failed server for publishing when it is available.

The default reconnect attempt value may be 1 in certain example embodiments, although this value may be set or reset in certain example embodiments. For example, a function call to WmJMSConfig.setReconnectAttempts (int reconnectAttempts) may be made, or the value for the property "com.webmethods.jms.reconnectAttempts" may be set in the wmjms.properties config file.

In certain example embodiments, JMS API connection constructors may be modified to delegate processing to a cluster connection when the connection is associated with a cluster connection factory.

Given the description above, it will be appreciated that certain example embodiments enable users to set up brokers in a cluster, automatically synchronize metadata in the cluster, apply routing policies, dynamically scale the architecture, etc. In certain example embodiments, users may scale-up the broker architecture without necessarily needing to restart any servers, essentially providing a dynamic cluster that can be defined or redefined by "hot deploying" additional brokers to the cluster, without requiring a restart, and providing for automatic meta data exchange. Because routing policies may be layered or compound in certain example embodiments, users may apply multiple policies to a single topic or queue. Accordingly, it becomes possible to support very complex messaging patterns with a very simple set of basic building blocks.

Figure 22:
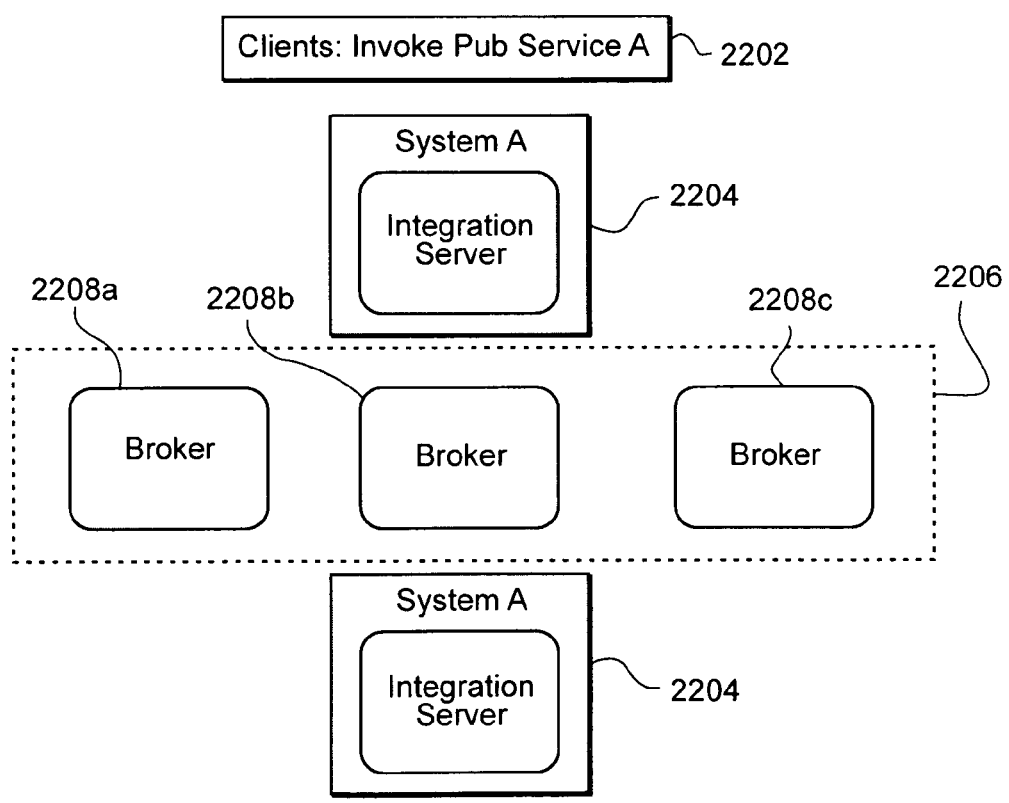
FIGS. 22-23 show different techniques for using an integration server to call a publishing service and trigger.
Figure 23:
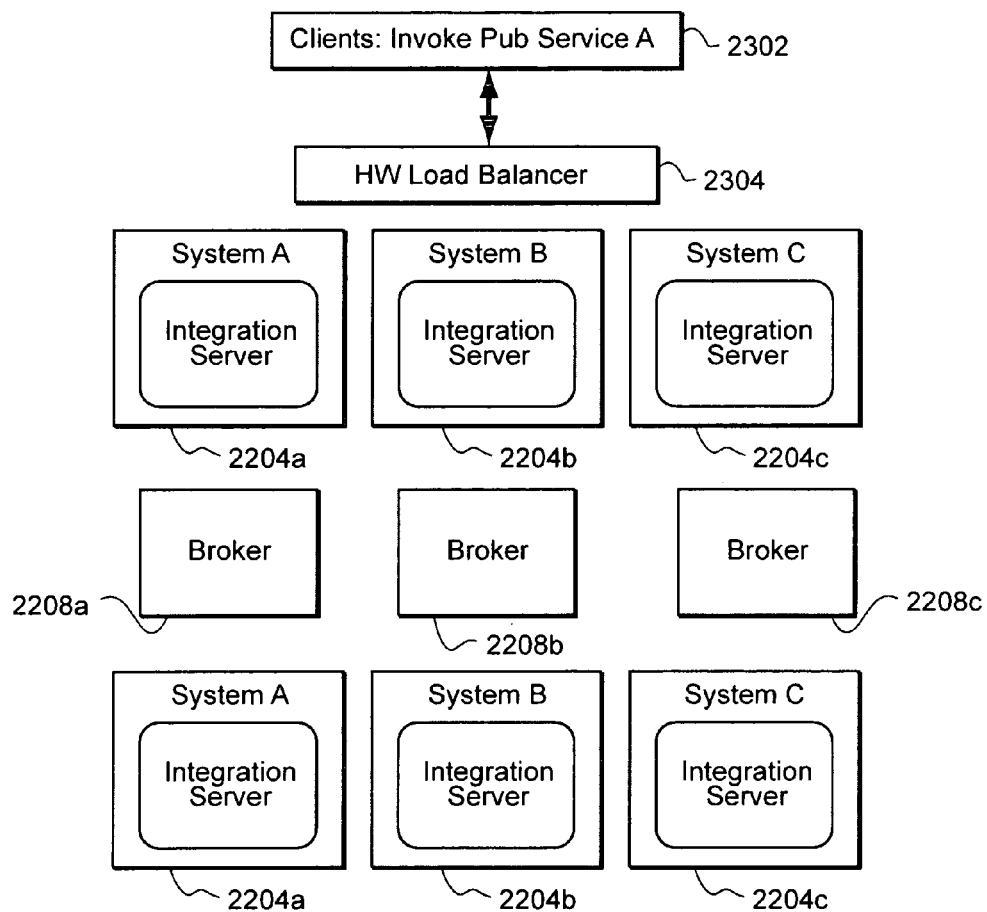

FIGS. 22-23 show different techniques for using an integration server to call a publishing service and/or trigger. The same use case is shown in FIGS. 22-23, namely, publishing three messages (e.g., JMS messages) from a single service on an integration server, sending one message to each of three different brokers, calling one trigger, and using one service to finally process the message. FIG. 22 begins with a client 2202 attempting to invoke a publishing service A. To accomplish this, the client 2202 uses an arbitrary system (in this case, System A) 2204 to publish a message. This message is then passed to each broker 2208a-c in the policy-based broker cluster 2206 via a cluster connection in accordance with the selected policy (which in this example scenario requires sending the message to all three brokers 2208a-c). The appropriate broker(s) 2208 invokes the service in accordance with the message. Accordingly, a single message may be routed to multiple brokers based on a client-side policy-based load balancing scheme. Additionally, using the FIG. 22 approach, multiple integration server and multiple brokers may be added; however, a single publish service and trigger may still be called.

Unlike the FIG. 22 example, FIG. 23 involves a client 2302 communicating with a hardware load balancer 2304. This hardware load balancer 2304 is not client based. In any event, to pass the same message to each broker 2208a-c, the same message is distributed to each of associated system 2204a-c. In other words, the hardware load balancer sends three separate messages to three separate systems to invoke a single service via three separate brokers. Ultimately, the service is properly invoked by one of the three brokers.

It thus will be appreciated that the FIG. 22 arrangement is an improvement over the FIG. 23 arrangement. Such improvements are enabled, for example, because policy definitions are maintained at the clients and the routing of messages to/through brokers is accomplished through a broker cluster using these load balancing policies without necessarily relying on a hardware load balancer and a specific system-to-broker mapping.

It thus becomes possible to implement a number of advantageous features. For example, it becomes possible to implement guaranteed multi-send functionality, e.g., enabling the logic to guarantee an "all or nothing" style of delivery to a set of brokers, beyond both the XA programming model and the standard JMS 1.1 capabilities. As another example, composite cluster policies provide the ability to acknowledge messages on multiple brokers. As still another example, policy-based message routing enables current policies to be extended and built upon in the future. For example, although messages may be published to brokers in a cluster based on a simple defined policy (e.g., Round Robin, Sticky, Multi Send Best Effort, Multi Send Guaranteed, Random, etc.), these policies may be combined or layered to provide further compound policies.

In yet another example, a client-side API may be used to configure brokers in a broker cluster, providing for metadata synchronization. Message producers and consumers thus may use available brokers in the cluster to send and receive messages and, in the event of a failure, remaining brokers may be used without affecting the publish-subscribe activity, if so specified in the defined policy. By contrast, in a standard JMS implementation, clients typically have to reconnect to the server in case of failure. Although hardware clustering is another alternative, it will be appreciated that it requires starting another node with the same metadata, and the system will not be available until the node has started serving client requests.

In yet another example, brokers may be added or removed from a cluster without modifying the client programs. Thus, client programs may lookup cluster connection factories (e.g., using JNDI) and perform publish-subscribe activities. By contrast, in a standard JMS implementation, individual connections typically have to be defined for all brokers, and new connections typically have to be defined if any new servers are added or updated. However, certain example embodiments reduce (and sometimes completely eliminate) the need for new JNDI connection objects to be defined when new nodes are added to the cluster.

It will be appreciated that the classes, methods, properties, etc., described above are provided by way of example. In other words, the same and/or different classes, methods, properties, etc. may be provided in connection with different example embodiments. For example, other public methods may be provided to help construct the cluster and composite connection factories.

It will be appreciated that as used herein, the terms system, subsystem, service, programmed logic circuitry, and the like may be implemented as any suitable combination of software, hardware, firmware, and/or the like.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An application integration system, comprising:
a publishing application configured to generate and send a message, the message being sendable in accordance with a user-defined composite policy comprising at least first and second policy layers;
first and second broker clusters, each said broker cluster comprising a plurality of brokers, each said broker being configured to relay messages from the publishing application to at least one subscribing application;
a composite cluster connection associated with the publishing application; and a plurality of cluster connections associated with the composite cluster connection;

wherein the composite cluster connection is configured to route the message to at least one said cluster connection in dependence on the first policy layer, wherein at least one said policy layer is based on a multi-send policy that sends messages to multiple brokers, wherein the multi-send policy is a "guaranteed" multi-send policy that is considered successful only if N out of M brokers receive the message, where N is a user-defined constant and where M is the number of brokers in the associated cluster, and wherein each said cluster connection is configured to route the message to at least one broker in dependence on the second policy layer.

2. The system of claim 1, wherein each said policy layer is based on one of: (a) a round robin load balancing policy, (b) a sticky load balancing policy in which a particular broker is published to until a failure occurs, at which time a different broker is published to, (c) random allocation, (d) a "document size" policy that routes messages to different brokers based on the message size, (e) a weighted round-robin policy in which each broker is assigned a weight that signifies, relative to the other brokers, how well that broker server performs and thus how many more or fewer messages may be sent to each broker compared to the other brokers, and (f) a multi-send policy that sends messages to multiple brokers.

3. The system of claim 1, wherein the first policy layer is different from the second policy layer.

4. The system of claim 1, wherein another multi-send policy is a "best effort" multi-send policy that is considered successful if at least one said broker receives the message.

5. The system of claim 1, wherein the multi-send policy includes duplicate message detection, the duplicate message detection being practiced by comparing Universally Unique IDs (UUIDs) associated with the messages.

6. The system of claim 1, wherein the multi-send policy includes message acknowledgement at at least some of the brokers.

7. The system of claim 1, further comprising at least one subscribing application configured to receive the message from the publishing application and cause a service to be executed in dependence on the message.

8. The system of claim 1, wherein the message is a JMS message.

9. An application integration system, comprising:
a publishing application configured to generate and send a message, the message being sendable in accordance with a user-defined composite policy comprising at least first and second policy layers;
first and second broker clusters, each said broker cluster comprising a plurality of brokers, each said broker being configured to relay messages from the publishing application to at least one subscribing application;
a composite cluster connection associated with the publishing application;
a plurality of cluster connections associated with the composite cluster connection;
a subscribing composite cluster connection associated with each said subscribing application; and
a plurality of subscribing cluster connections associated with the subscribing composite cluster connection,
wherein the composite cluster connection is configured to route the message to at least one said cluster connection in dependence on the first policy layer,
wherein each said cluster connection is configured to route the message to at least one broker in dependence on the second policy layer,
wherein each said subscribing composite cluster connection is configured to route an acknowledgement message to at least one said subscribing cluster connection in dependence on a first subscribing policy layer, and
wherein each said subscribing cluster connection is configured to route the message to at least one broker in dependence on a subscribing policy layer.

10. In an application integration system, a message routing method comprising:
providing a publishing application;
providing first and second broker clusters, each said broker cluster comprising a plurality of brokers, each said broker being configured to relay messages from the publishing application to at least one subscribing application;
associating a composite cluster connection with the publishing application;
associating a plurality of cluster connections with the composite cluster connection;
generating a message by the publishing application; and
sending the message from the publishing application to the broker cluster in accordance with a user-defined composite policy comprising at least first and second policy layers, the message being routed from the composite cluster connection to at least one said cluster connection in dependence on the first policy layer, the messaging being routed from the at least one said cluster to at least one said broker in dependence on the second policy layer,
wherein at least one said policy layer is based on a multi-send policy that sends messages to multiple brokers, and
wherein the multi-send policy is a "guaranteed" multi-send policy that is considered successful only if N out of M brokers receive the message, where N is a user-defined constant and where M is the number of brokers in the associated cluster.

11. The method of claim 10, wherein each said policy layer is based on one of: (a) a round robin load balancing policy, (b) a sticky load balancing policy in which a particular broker is published to until a failure occurs, at which time a different broker is published to, (c) random allocation, (d) a "document size" policy that routes messages to different brokers based on the message size, (e) a weighted round-robin policy in which each broker is assigned a weight that signifies, relative to the other brokers, how well that broker server performs and thus how many more or fewer messages may be sent to each broker compared to the other brokers, and (f) a multi-send policy that sends messages to multiple brokers.

12. The method of claim 10, wherein the first policy layer is different from the second policy layer.

13. The method of claim 10, wherein another multi-send policy is a "best effort" multi-send policy that is considered successful if at least one said broker receives the message.

14. The method of claim 10, further comprising detecting duplicate messages by comparing Universally Unique IDs (UUIDs) associated with the messages.

15. The method of claim 10, further comprising acknowledging message receipt at at least some of the brokers.

16. The method of claim 10, further comprising providing at least one subscribing application configured to receive the message from the publishing application and cause a service to be executed in dependence on the message.

17. The method of claim 10, wherein the message is a JMS message.

18. The method of claim 10, further comprising deploying additional brokers and/or publishing applications during operation of the application integration system.

19. The method of claim 10, further comprising redefining the composite policy.

20. An application integration system, comprising:
a plurality of broker cluster systems, each one of the plurality of broker cluster systems including a plurality of brokers with each one of the plurality of brokers including at least one processor that is configured to relay received messages to subscribing applications;
a publishing computing system that includes at least one processor and configured to transmit a message in accordance with a composite policy that includes a first policy layer and a second policy layer, at least one of the first and second policy layers being based on a multi-send policy that sends messages to multiple brokers;
a composite cluster connection associated with the publishing computing system; and
a plurality of cluster connections associated with the composite cluster connection;
wherein the composite cluster connection is configured to route the message to at least one cluster connection of the plurality of cluster connections in accordance with the first policy layer, and
wherein the at least one cluster connection is configured to route the message to at least one broker in dependence on the second policy layer,
wherein the multi-send policy is considered successful in accordance with a determination that N out of M brokers receive the message, where N is a determined value and M is the number of brokers in an associated cluster.

21. An application integration system, comprising:
a publishing application configured to generate and send a message, the message being sendable in accordance with a composite policy comprising at least first and second policy layers;
first and second broker clusters, each said broker cluster comprising a plurality of brokers, each said broker being configured to relay messages from the publishing application to at least one subscribing application;
a composite cluster connection associated with the publishing application;
a plurality of cluster connections associated with the composite cluster connection;
a subscribing composite cluster connection associated with each said subscribing application; and
a plurality of subscribing cluster connections associated with the subscribing composite cluster connection,
wherein the subscribing composite cluster connection is configured to route an acknowledgement message to at least one said subscribing cluster connection in dependence on a first subscribing policy layer,
wherein each said subscribing cluster connection is configured to route the message to at least one broker in dependence on a subscribing policy layer,
wherein the composite cluster connection is configured to route the message to at least one said cluster connection in dependence on the first policy layer, and
wherein each said cluster connection is configured to route the message to at least one broker in dependence on the second policy layer.

* * * * *